(12) United States Patent
Hatano et al.

(10) Patent No.: US 7,904,188 B2
(45) Date of Patent: Mar. 8, 2011

(54) INFORMATION OUTPUTTING DEVICE, INFORMATION OUTPUT CONTROLLING METHOD, AND INFORMATION OUTPUT CONTROLLING PROGRAM

(75) Inventors: Kouji Hatano, Tokyo (JP); Tetsuya Ushijima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 954 days.

(21) Appl. No.: 11/571,306

(22) PCT Filed: Sep. 8, 2005

(86) PCT No.: PCT/JP2005/016533
§ 371 (c)(1),
(2), (4) Date: Dec. 27, 2006

(87) PCT Pub. No.: WO2006/046357
PCT Pub. Date: May 4, 2006

(65) Prior Publication Data
US 2007/0233905 A1 Oct. 4, 2007

(30) Foreign Application Priority Data

Oct. 26, 2004 (JP) ................................. 2004-311402

(51) Int. Cl.
*G06F 17/00* (2006.01)
(52) U.S. Cl. ........................................................ 700/94
(58) Field of Classification Search .................... 700/94; 455/3.06
See application file for complete search history.

(56) References Cited

U.S. PATENT DOCUMENTS 6,662,022 B1 * 12/2003 Kanamori et al. ......... 455/556.1
6,944,287 B2    9/2005 Mori

FOREIGN PATENT DOCUMENTS

| CN | 1292967 A | 4/2001 |
| CN | 1325250 A | 12/2001 |
| JP | 06-169435 A | 6/1994 |
| JP | 06-334928 A | 12/1994 |
| JP | 07-030971 A | 1/1995 |
| JP | 10-200989 A | 7/1998 |
| JP | 3065744 U | 11/1999 |
| JP | 2001-251697 A | 9/2001 |

(Continued)

OTHER PUBLICATIONS

Chinese Office action.

*Primary Examiner* — Andrew C Flanders
(74) *Attorney, Agent, or Firm* — Pearne & Gordon LLP

(57) ABSTRACT

An output method is changed optimally in response to a difference of a device connected to an output device and a combination of output media streams, and user's convenience is improved. Each of media state sensing unit 15, 25, 35, 45 for sensing a state of a media stream sends out a media state sensing signal to a control portion 90, and each of connection state sensing unit 62, 72, 82 for sensing a connection state between an outputting unit 51 and a providing device, which presents the media stream visually or audibly, sends out a connection state sensing signal to the control portion 90. The control portion 90 decides an output state based on priority output information 931, which specifies a preferential output state of the media stream, the media state sensing signal, and the connection state sensing signal, and then the outputting unit 51 outputs the media stream to the providing device.

9 Claims, 16 Drawing Sheets

FOREIGN PATENT DOCUMENTS

| | | |
|---|---|---|
| JP | 2002-027029 | 1/2002 |
| JP | 2002-171314 A | 6/2002 |
| JP | 2003-032333 A | 1/2003 |
| JP | 2003-032800 A | 1/2003 |
| JP | 2003-101611 A | 4/2003 |
| JP | 2003-204600 A | 7/2003 |
| JP | 2003-283599 A | 10/2003 |
| JP | 2004-015166 A | 1/2004 |
| WO | 99-45685 | 9/1999 |

* cited by examiner

FIG. 4

| DEVICE | OUTPUT PRIORITY EVERY MEDIA TYPE | | | |
|---|---|---|---|---|
| | HI-FI STEREO | STEREO | MONAURAL | MONAURAL TALKING |
| HEADSET | 0 | 1 | 1 | 3 |
| STEREO HEADPHONE | 3 | 2 | 1 | 1 |
| MONAURAL EARPHONE | 0 | 1 | 2 | 2 |
| BUILT-IN SPEAKER | 1 | 1 | 1 | 2 |

FIG. 7

| STEP | MEDIA STATE INFORMATION (921) | | CONNECTION STATE INFORMATION (922) | | OUTPUT STATE INFORMATION (923) | |
|---|---|---|---|---|---|---|
| INITIAL STATE | 1100a | | 1100b | | 1100c | |
| | INPUT CHANNEL | MEDIA STATE | OUTPUT CHANNEL | CONNECTED DEVICE | OUTPUT CHANNEL | OUTPUT CONTENTS |
| | IN1 | — | OUT1 | — | OUT1 | — |
| | IN2 | — | OUT2 | — | OUT2 | — |
| | IN3 | — | OUT3 | BUILT-IN SPEAKER | OUT3 | — |
| | IN4 | — | | | | |
| S106 | 1106a | | | | 1106c | |
| | INPUT CHANNEL | MEDIA STATE | | | OUTPUT CHANNEL | OUTPUT CONTENTS |
| | IN1 | — | | | OUT1 | — |
| | IN2 | — | | | OUT2 | — |
| | IN3 | HI-FI STEREO | | | OUT3 | IN3 |
| | IN4 | — | | | | |
| S116 | 1116a | | | | 1116c | |
| | INPUT CHANNEL | MEDIA STATE | | | OUTPUT CHANNEL | OUTPUT CONTENTS |
| | IN1 | — | | | OUT1 | — |
| | IN2 | STEREO | | | OUT2 | — |
| | IN3 | HI-FI STEREO | | | OUT3 | IN2+IN3 |
| | IN4 | — | | | | |
| S126 | 1126a | | | | 1126c | |
| | INPUT CHANNEL | MEDIA STATE | | | OUTPUT CHANNEL | OUTPUT CONTENTS |
| | IN1 | MONAURAL TALKING | | | OUT1 | — |
| | IN2 | — | | | OUT2 | — |
| | IN3 | HI-FI STEREO | | | OUT3 | IN1+IN3 |
| | IN4 | — | | | | |
| S132 | | | 1132b | | 1132c | |
| | | | OUTPUT CHANNEL | CONNECTED DEVICE | OUTPUT CHANNEL | OUTPUT CONTENTS |
| | | | OUT1 | HEADSET | OUT1 | IN1 |
| | | | OUT2 | — | OUT2 | — |
| | | | OUT3 | BUILT-IN SPEAKER | OUT3 | IN3 |

FIG. 8

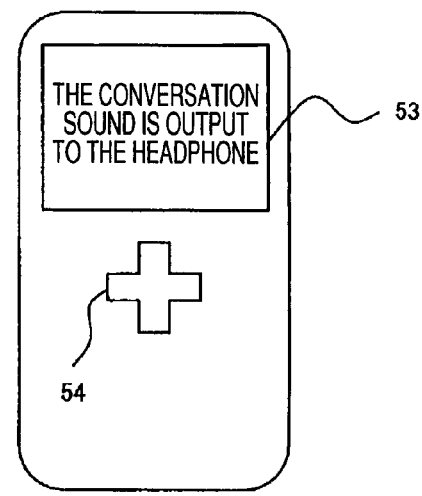

FIG. 11

| STEP | MEDIA STATE INFORMATION 921 | CONNECTION STATE INFORMATION 922 | OUTPUT STATE INFORMATION 923 |
|---|---|---|---|
| INITIAL STATE | 2200a<br>INPUT CHANNEL / MEDIA STATE<br>IN1 / —<br>IN2 / —<br>IN3 / —<br>IN4 / — | 2200b<br>OUTPUT CHANNEL / CONNECTED DEVICE<br>OUT1 / —<br>OUT2 / HEADPHONE<br>OUT3 / BUILT-IN SPEAKER | 2200c<br>OUTPUT CHANNEL / OUTPUT CONTENTS<br>OUT1 / —<br>OUT2 / —<br>OUT3 / — |
| S206 | 2206a<br>INPUT CHANNEL / MEDIA STATE<br>IN1 / —<br>IN2 / —<br>IN3 / HI-FI STEREO<br>IN4 / — | | 2206c<br>OUTPUT CHANNEL / OUTPUT CONTENTS<br>OUT1 / —<br>OUT2 / IN3<br>OUT3 / — |
| S216 | 2216a<br>INPUT CHANNEL / MEDIA STATE<br>IN1 / —<br>IN2 / STEREO<br>IN3 / HI-FI STEREO<br>IN4 / — | | 2216c<br>OUTPUT CHANNEL / OUTPUT CONTENTS<br>OUT1 / —<br>OUT2 / IN2+IN3<br>OUT3 / — |
| S226 | 2226a<br>INPUT CHANNEL / MEDIA STATE<br>IN1 / MONAURAL TALKING<br>IN2 / —<br>IN3 / HI-FI STEREO<br>IN4 / — | | 2226c<br>OUTPUT CHANNEL / OUTPUT CONTENTS<br>OUT1 / —<br>OUT2 / IN3<br>OUT3 / IN1 |

FIG. 12

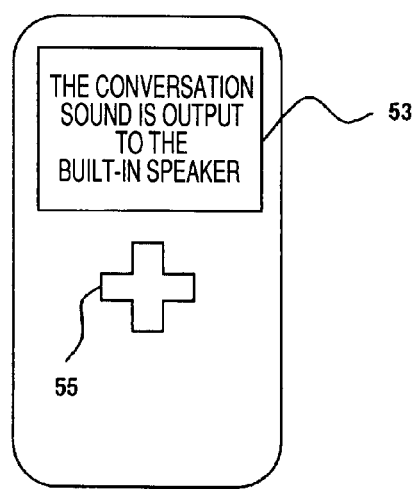

FIG. 15

| STEP | MEDIA STATE INFORMATION | | CONNECTION STATE INFORMATION | | OUTPUT STATE INFORMATION | |
|---|---|---|---|---|---|---|
| | \~921 | | \~922 | | \~923 | |
| INITIAL STATE | \~3300a | | \~3300b | | \~3300c | |
| | INPUT CHANNEL | MEDIA STATE | OUTPUT CHANNEL | CONNECTED DEVICE | OUTPUT CHANNEL | OUTPUT CONTENTS |
| | IN1 | – | OUT1 | – | OUT1 | – |
| | IN2 | – | OUT2 | – | OUT2 | – |
| | IN3 | – | OUT3 | BUILT-IN SPEAKER | OUT3 | – |
| | IN4 | – | | | | |
| S306 | \~3306a | | | | \~3306c | |
| | INPUT CHANNEL | MEDIA STATE | | | OUTPUT CHANNEL | OUTPUT CONTENTS |
| | IN1 | – | | | OUT1 | – |
| | IN2 | – | | | OUT2 | – |
| | IN3 | – | | | OUT3 | IN4 |
| | IN4 | MONAURAL | | | | |
| S316 | \~3316a | | | | \~3316c | |
| | INPUT CHANNEL | MEDIA STATE | | | OUTPUT CHANNEL | OUTPUT CONTENTS |
| | IN1 | – | | | OUT1 | – |
| | IN2 | STEREO | | | OUT2 | – |
| | IN3 | – | | | OUT3 | IN2+IN4 |
| | IN4 | MONAURAL | | | | |
| S326 | \~3326a | | | | \~3326c | |
| | INPUT CHANNEL | MEDIA STATE | | | OUTPUT CHANNEL | OUTPUT CONTENTS |
| | IN1 | MONAURAL TALKING | | | OUT1 | – |
| | IN2 | – | | | OUT2 | – |
| | IN3 | – | | | OUT3 | IN1+IN4 |
| | IN4 | MONAURAL | | | | |
| S332 | | | \~3332b | | \~3332c | |
| | | | OUTPUT CHANNEL | CONNECTED DEVICE | OUTPUT CHANNEL | OUTPUT CONTENTS |
| | | | OUT1 | – | OUT1 | – |
| | | | OUT2 | MONAURAL EARPHONE | OUT2 | IN1 |
| | | | OUT3 | BUILT-IN SPEAKER | OUT3 | IN4 |

FIG. 18(a)

| DEVICE | OUTPUT PRIORITY EVERY MEDIA TYPE | | | |
|---|---|---|---|---|
| | HI-FI STEREO | STEREO | MONAURAL | MONAURAL TALKING |
| HEADSET | 0 | 1 | 1 | 3 |
| STEREO HEADPHONE | 3 | 2 | 1 | 1 |
| MONAURAL EARPHONE | 0 | 1 | 2 | 2 |
| BUILT-IN SPEAKER | 1 | 1 | 1 | 2 |

FIG. 18(b)

| DEVICE | OUTPUT PRIORITY EVERY MEDIA TYPE | | | |
|---|---|---|---|---|
| | HI-FI STEREO | STEREO | MONAURAL | MONAURAL TALKING |
| HEADSET | 2 | 2 | 2 | 3 |
| STEREO HEADPHONE | 3 | 2 | 2 | 2 |
| MONAURAL EARPHONE | 2 | 2 | 3 | 2 |
| BUILT-IN SPEAKER | 1 | 1 | 1 | 1 |

FIG. 18(c)

| DEVICE | OUTPUT PRIORITY EVERY MEDIA TYPE | | | |
|---|---|---|---|---|
| | HI-FI STEREO | STEREO | MONAURAL | MONAURAL TALKING |
| HEADSET | 1 | 1 | 1 | 3 |
| STEREO HEADPHONE | 1 | 1 | 1 | 2 |
| MONAURAL EARPHONE | 1 | 1 | 1 | 2 |
| BUILT-IN SPEAKER | 1 | 1 | 1 | 1 |

INFORMATION OUTPUTTING DEVICE, INFORMATION OUTPUT CONTROLLING METHOD, AND INFORMATION OUTPUT CONTROLLING PROGRAM

TECHNICAL FIELD

The present invention relates to an information output device having a function of outputting video audio data.

BACKGROUND ART

The development of the multifunction of the cellular phone terminal is proceeding recently. The functions of receiving the TV broadcasting, the radio broadcasting, etc. are provided in addition to the phone conversation function and the electronic mail sending/receiving function. Also, the function of watching the contents of the TV broadcasting, the radio broadcasting, etc., the function of reproducing the contents of the movie, the music, etc. stored in the memory card, or the like are provided. In such cellular phone terminal, since the user can talk on the phone while reproducing the contents, such user can communicate by phone so as not to interrupt the play of the contents (see Patent Literature 1, for example).

In such cellular phone terminal having the content reproducing function in the prior art, when the phone call comes into this terminal during reproducing of the contents, the content reproducing sound is output from the speaker of the connected stereo headphone on one side and the phone conversation sound is output from the speaker on the other side.

Accordingly, the user can recognize simultaneously both the content reproducing sound and the phone conversation sound without confusion (see Patent Literature 1, for example).

Patent Literature 1: JP-A-2002-27029

DISCLOSURE OF THE INVENTION

Problems that the Invention is to Solve

However, in the cellular phone terminal in the prior art, in some cases the user could not listen the content reproducing sound and the phone conversation sound distinguishably at the same time depending on the type of the audio device connected to the cellular phone terminal.

For example, when the sound reproduced from the above cellular phone terminal is changed from the stereo headphone to the monaural earphone, both the content reproducing sound and the phone conversation sound are superposed and reproduced. Alternately, only either of the content reproducing sound and the phone conversation sound is reproduced. In this manner, the user could not listen simultaneously the content reproducing sound and the phone conversation sound distinguishably. Therefore, it is difficult for the user to execute simultaneously the listening of the reproduced contents and the talking on phone.

Also, the cellular phone terminal in the prior art could not automatically select the optimal presenting method in answer to the function or the performance of the audio device connected to this cellular phone terminal.

For instance, when the high-performance headphone is connected, the music contents are output to the headphone and the phone conversation sound is output to the built-in speaker of the terminal. Otherwise, when the headset having the talking-only monaural headphone and the microphone as a set is connected, the phone conversation sound is output to the headset and the music contents are output to the built-in speaker of the terminal. In this manner, the cellular phone terminal in the prior art could not automatically switch its output state in answer to the function or the performance of the connected device.

The present invention has been made to solve the problems in the prior art, and it is an object of the present invention to provide an information output device capable of optimizing an output method in response to a combination of an audio device connected to a cellular phone terminal and a media stream being out.

Also, the present invention has been made to solve the problems in the prior art, and it is an object of the present invention to provide an output control method capable of changing optimally an output method in response to a combination of an audio device connected to a cellular phone terminal and a media stream being out.

Also, the present invention has been made to solve the problems in the prior art, and it is an object of the present invention to provide an information output control program capable of changing optimally an output method in response to a combination of an audio device connected to a cellular phone terminal and a media stream being out.

Here, the media stream mentioned in this specification denotes a series of data strings that can be converted into at least an image or a sound or a vibration and are arranged in time series. By way of example, the phone conversation sound, the television broadcasting, or the radio broadcasting, the video, the audio, the vibration pattern, or the like such as the moving picture, the music, or the like stored in the memory card, or the like is supposed.

Means for Solving the Problems

In order to solve the problems in the prior art, an information output device of the present invention includes a media state sensing unit for sensing a state of a media stream and sending out a first sensing signal; a connection state sensing unit for sensing a connection state of a providing device used to provide the media stream and sending out a second sensing signal; a media stream output state deciding unit for deciding an output state of the media stream, based on the first sensing signal output from the media state sensing unit and the second sensing signal output from the connection state sensing unit; and an outputting unit for outputting the media stream to the providing device based on an instruction from the media stream output state deciding unit. According to this configuration, it can be changed in response to a combination of media streams and the connection state of the providing devices how the media stream should be output to the providing device, and thus user's convenience can be improved.

Also, in the information output device of the present invention, the media state sensing unit senses the state of one or plural media streams and sends out the first sensing signal. According to this configuration, the output of the providing device can be changed in response to respective states of the media streams, and thus user's convenience can be improved.

Also, in the information output device of the present invention, the connection state sensing unit senses the connection state of one or plural providing devices and sends out the second sensing signal, and the media stream output state deciding unit decides that the media stream is output to one of the plural providing devices. According to this configuration, one or plural media streams can be output collectively to one providing device out of a plurality of providing devices. Therefore, the information can be collected into a single place, and thus user's convenience can be improved.

Also, in the information output device of the present invention, the connection state sensing unit senses the connection state of plural providing devices and sends out the second sensing signal, and the media stream output state deciding unit decides that the media stream is output to the plural providing devices. According to this configuration, one or plural media streams can be output to respective providing devices, and thus the information of individual media stream can be discriminated more clearly.

Also, in the information output device of the present invention, the output state of the media stream is decided based on priority output information that specifies the output state of the media stream. According to this configuration, it can be changed optimally in response to a combination of media streams and the connection state of the providing devices how the media stream should be output to the providing device, and thus user's convenience can be improved.

Also, the information output device of the present invention further includes a setting unit for setting the priority output information. According to this configuration, it can be changed optimally to reflect the user's taste how the media stream should be output to the providing device, and thus user's convenience can be improved.

Also, the information output device of the present invention further includes an operation input accepting unit for sensing an operation input to the information output device and outputting operation input information; wherein the output state is decided based on the operation input information. According to this configuration, it can be changed flexibly in answer to the user's choice how the media stream should be output to the providing device, and thus user's convenience can be improved.

Also, an information output control method of the present invention of outputting a media stream, includes a step of sensing a state of a media stream; a step of sending out the sensed state of the media stream as a first sensing signal; a step of sensing a connection state of a providing device used to provide the media stream; a step of sending out the sensed connection state of the providing device as a second sensing signal; a step of deciding an output state of the media stream based on the first sensing signal and the second sensing signal; and a step of outputting the media stream to the providing device based on the output state. According to this method, it can be changed in response to a combination of media streams and the connection state of the providing devices how the media stream should be output to the providing device, and thus user's convenience can be improved.

Also, in the information output control method of the present invention, the output state of the media stream is decided based on priority output information that specifies the output state of the media stream. According to this method, it can be changed optimally in response to a combination of media streams and the connection state of the providing devices how the media stream should be output to the providing device, and thus user's convenience can be improved.

Also, the information output control method of the present invention further includes a step of setting the priority output information. According to this method, it can be changed optimally to reflect the user's taste how the media stream should be output to the providing device, and thus user's convenience can be improved.

Also, the information output control method of the present invention further includes a step of sensing an operation input to output operation input information; and a step of deciding the output state based on an output of the operation input information. According to this method, it can be changed flexibly in answer to the user's choice how the media stream should be output to the providing device, and thus user's convenience can be improved.

Also, an information output control program of the present invention of outputting a media stream, includes a step of sensing a state of a media stream; a step of sending out the state of the media stream as a first sensing signal; a step of sensing a connection state of a providing device used to provide the media stream; a step of sending out the connection state of the providing device as a second sensing signal; a step of deciding an output state of the media stream based on the first sensing signal and the second sensing signal; and a step of outputting the media stream to the providing device based on the output state. According to this program, it can be changed in response to a combination of media streams and the connection state of the providing devices how the media stream should be output to the providing device, and thus user's convenience can be improved.

Also, in the information output control program of the present invention, priority output information that specifies the output state of the media stream is formed, and the program further includes a step of deciding the output state of the media stream based on the priority output information. According to this program, it can be changed optimally in response to a combination of media streams and the connection state of the providing devices how the media stream should be output to the providing device, and thus user's convenience can be improved.

Also, the information output control program of the present invention further includes a step of setting the priority output information. According to this program, it can be changed optimally to reflect the user's taste how the media stream should be output to the providing device, and thus user's convenience can be improved.

Also, the information output control program of the present invention further includes a step of sensing an operation input to output operation input information; and a step of deciding the output state based on an output of the operation input information. According to this program, it can be changed flexibly in answer to the user's choice how the media stream should be output to the providing device, and thus user's convenience can be improved.

ADVANTAGES OF THE INVENTION

According to the present invention, the output method can be changed optimally in response to a difference of the providing device connected to the information output device and a combination of output media streams, and user's convenience can be improved.

BRIEF DESCRIPTION OF THE DRAWINGS

FIG. 4 A view showing priority output information of the cellular phone terminal in embodiments of the present invention.

FIG. 7 A view showing media state information, connection state information, and output state information of the cellular phone terminal in Embodiment 1 of the present invention.

FIG. 8 A view showing an output starting display in Embodiment 1 of the present invention.

FIG. 11 A view showing media state information, connection state information, and output state information of the cellular phone terminal in Embodiment 2 of the present invention.

FIG. 12 A view showing an output starting display in Embodiment 2 of the present invention.

FIG. 15 A view showing media state information, connection state information, and output state information of the cellular phone terminal in Embodiment 3 of the present invention.

FIG. 18(a) a view showing a "sound quality priority mode" in Embodiment 4 of the present invention, (b) a view showing an "external output priority mode", and (c) a view showing a "concealed phone conversation mode".

Figure 1:
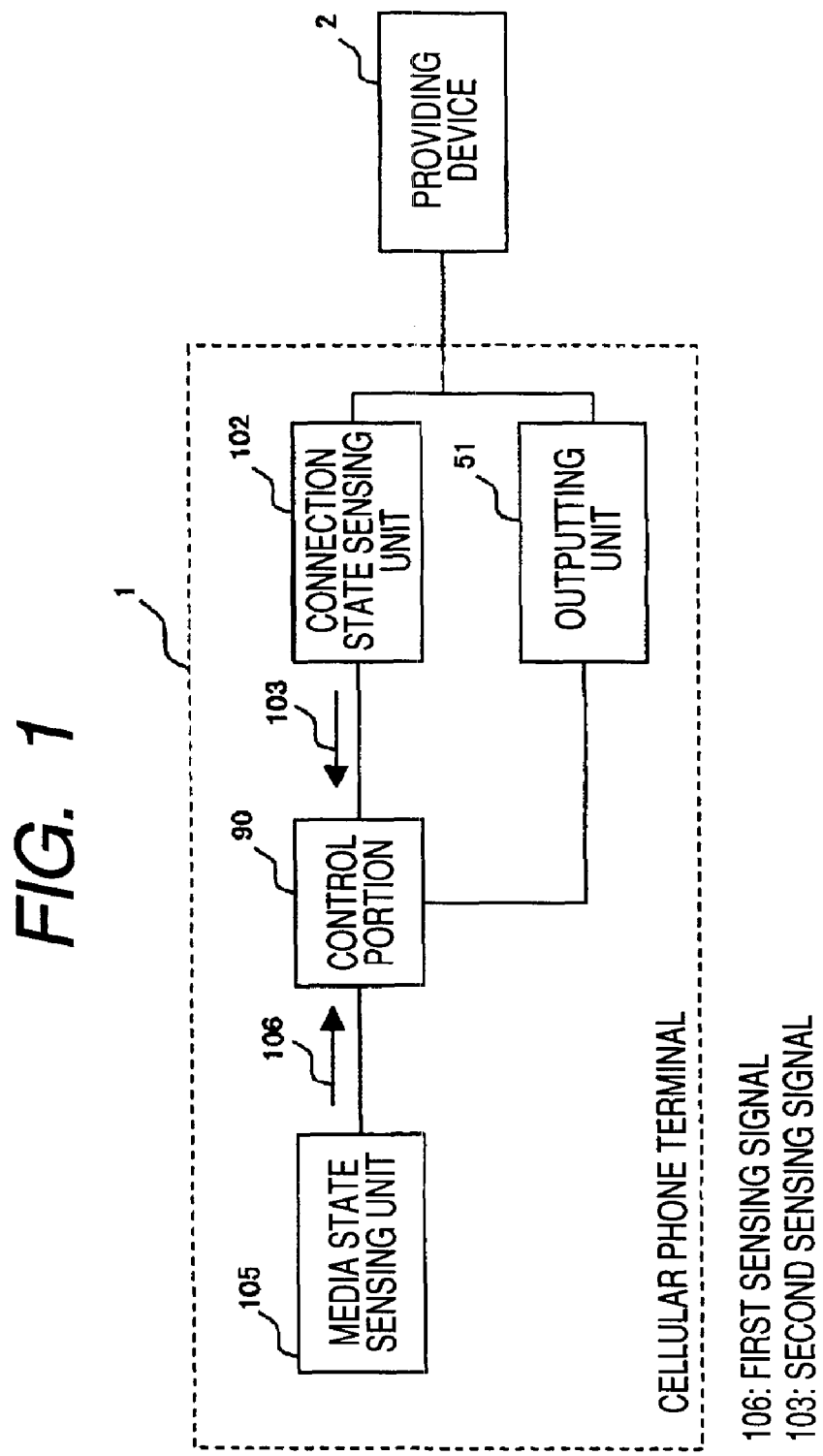
FIG. 1 A schematic configurative view of a cellular phone terminal in embodiments of the present invention.

DESCRIPTION OF REFERENCE NUMERALS 1 cellular phone terminal
102 connection state sensing unit
103 second sensing signal
105 media state sensing unit
106 first sensing signal
2 providing device
10 radio communication portion
11 radio communicating unit
12 coding unit
13 decoding unit
15 first media state sensing unit
20 ringtone reproduce portion
21 ringtone reproducing unit
25 second media state sensing unit
30 music reproduce portion
31 music data accumulate portion
32 music reproducing unit
35 third media state sensing unit
40 broadcasting receive portion
41 broadcasting receiving unit
42 separating unit
43 sound decoding unit
44 image decoding unit
45 fourth media state sensing unit
51 outputting unit
52 built-in microphone
53 displaying unit
54 cross key
55 operation input accepting unit
551 operation input information
56 setting unit
61 Bluetooth communicating unit
62 first connection state sensing unit
63 Bluetooth headset
71 headphone jack
72 second connection state sensing unit
73 stereo headphone
75 monaural earphone
81 built-in speaker
82 third connection state sensing unit
90 control portion
91 output destination deciding unit
92 state information holding unit
921 media state information
922 connection state information
923 output state information
93 priority output information holding unit
931 priority output information

BEST MODE FOR CARRYING OUT THE INVENTION

A best mode for carrying out the present invention will be explained with reference to the drawings hereinafter. In this case, the same reference symbols are affixed to the same constituent elements throughout all drawings used to explain the embodiments, and their duplicate explanation will be omitted herein.

FIG. 1 is a configurative view of a cellular phone terminal of the present invention. Out of the constituent elements illustrated in FIG. 1, a cellular phone terminal 1 is a portion that corresponds to an information output device of the present invention. The cellular phone terminal 1 has a media state sensing unit 105, a connection state sensing unit 102, an outputting unit 51, and a control portion 90.

A providing device 2 is connected to the cellular phone terminal 1, and presents visibly or audibly a media stream that the outputting unit 51 outputs. As the providing device 2, built-in liquid crystal display, external display device, LED, built-in speaker, headset, stereo headphone, and the like, for example, are considered.

The media state sensing unit 105 senses states such as start, play, end, etc. of the media stream that is input into the outputting unit 51. Also, the media state sensing unit 105 informs the control portion 90 of information about the state of the sensed media stream and the type of the media stream as a first sensing signal 106.

The connection state sensing unit 102 senses a connection state between the outputting unit 51 and the providing device 2. Then, the connection state sensing unit 102 informs the control portion 90 of the sensed connection state, the type of the providing device in the connection destination, etc. as a second sensing signal 103. The "connection state" denotes connection states between the providing device and the cellular phone terminal 1 such as connected state with the providing device, disconnected state from the providing device, states of controllers such as a volume controller, etc. provided to the providing device, and the like.

The control portion 90 decides an output state of the outputting unit 51 based on the first sensing signal 106 and the second sensing signal 103, and gives instructions to the outputting unit 51. The outputting unit 51 outputs the input media stream to the providing device 2 based on the output state that control portion 90 decided.

Figure 2:
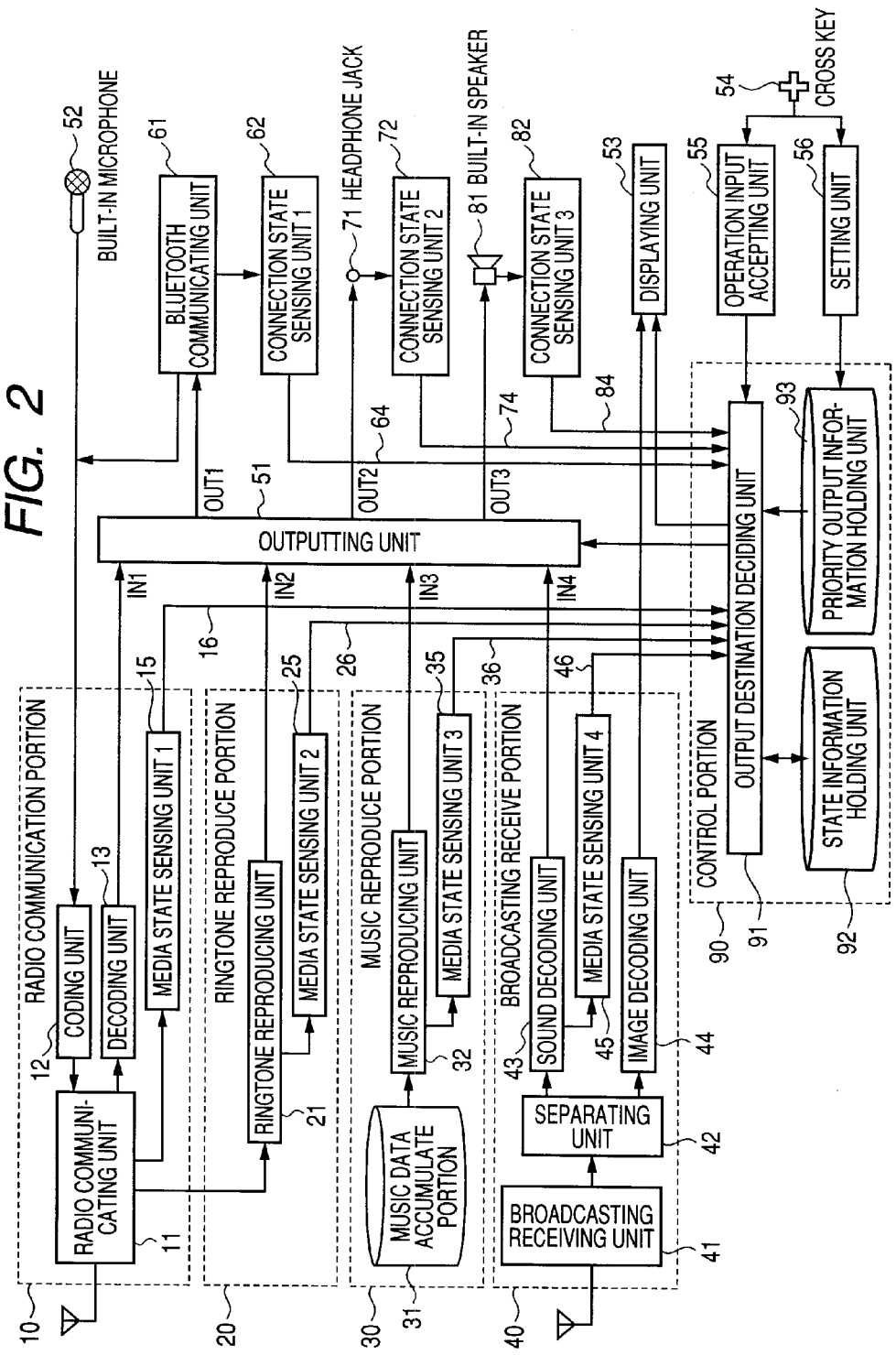
FIG. 2 A detailed configurative view of the cellular phone terminal in embodiments of the present invention.

FIG. 2 is a configurative view showing an internal configuration of the cellular phone terminal 1 in detail to explain embodiments of the present invention.

A radio communication portion 10 establishes a radio communication with other information equipments via a radio communication network.

The radio communication portion 10 has a radio communicating unit 11, a coding unit 12, a decoding unit 13, and a first media state sensing unit 15. The radio communicating unit 11 connects/disconnects the radio communication network and transmits/receives coded phone conversation sound data, and also senses the incoming call and informs a ringtone reproducing unit 21 of the call. Also, the radio communicating unit 11 senses a start and an end of the phone conversation and informs the first media state sensing unit 15 of them. The coding unit 12 codes the phone conversation sounds that a built-in microphone 52 and a Bluetooth communicating unit 61 output, and outputs them to the radio communicating unit 11. The decoding unit 13 decodes the phone conversation sound data that the radio communicating unit 11 receives, and outputs a derived sound media stream to an input channel IN1 of the outputting unit 51. The first media state sensing unit 15 outputs a media state sensing signal 16 containing information of the media state of the phone conversation sound to an output destination deciding unit 91 based on the notice from the radio communicating unit 11.

A ringtone reproduce portion 20 is a portion that has a function of reproducing a ringtone such as a phone melody, or the like when it received the incoming call. The ringtone reproduce portion 20 has the ringtone reproducing unit 21, and a second media state sensing unit 25. The ringtone reproducing unit 21 receives the notice of the incoming call from the radio communicating unit 11, outputs a media stream of the ringtone to an input channel IN2 of the outputting unit 51 by reproducing the ringtone, and inform the second media state sensing unit 25 of a start and an end of the reproduction. The second media state sensing unit 25 outputs a media state sensing signal 26 containing information of a media state of the ringtone to the output destination deciding unit 91 based on the notice from the ringtone reproducing unit 21.

A music reproduce portion 30 is a portion that has a function of reproducing the music contents. The music reproduce portion 30 has a music data accumulate portion 31, a music reproducing unit 32, and a third media state sensing unit 35.

The music data accumulate portion 31 accumulates data of the music contents in a compressed format such as AAC (Advanced Audio Coding), MP3 (MPEG-1 Audio Layer 3), or the like. The music reproducing unit 32 reproduces the music data accumulated in the music data accumulate portion 31, outputs a media stream of the reproduced sound to an input channel IN3 of the outputting unit 51, and informs a start and an end of the reproduction and a media type of the contents being reproduced to the third media state sensing unit 35. The third media state sensing unit 35 outputs a media state sensing signal 36 containing information of a media state of the reproduced sound to the output destination deciding unit 91 based on the notice from the music reproducing unit 32.

A broadcasting receive portion 40 is a portion that receives and reproduces the TV broadcasting and the radio broadcasting. The broadcasting receive portion 40 has a broadcasting receiving unit 41, a separating unit 42, a sound decoding unit 43, an image decoding unit 44, and a fourth media state sensing unit 45. The broadcasting receiving unit 41 detects the received broadcast wave, and outputs a program stream in an MPEG4 (Moving Picture Experts Group Phase 4) format containing the broadcasting contents to the separating unit 42. The separating unit 42 separates the program stream output from the broadcasting receiving unit 41 into sound data and image data, and outputs the sound data and the image data to the sound decoding unit 43 and the image decoding unit 44 respectively. The sound decoding unit 43 decodes the sound data that the separating unit 42 outputs, outputs a media stream of the decoded sound to an input channel IN4 of the outputting unit 51, and informs the fourth media state sensing unit 45 of a start and an end of the sound data and a media type. The image decoding unit 44 decodes the image data that the separating unit 42 outputs, generates pix map data every image frame, and outputs the data to a displaying unit 53. The fourth media state sensing unit 45 outputs a media state sensing signal 46 containing information of a media state of the decoded sound to the output destination deciding unit 91 based on the notice from the sound decoding unit 43.

In the embodiments of the present invention, the first media state sensing unit 15, the second media state sensing unit 25, the third media state sensing unit 35, and the fourth media state sensing unit 45 correspond to the media state sensing unit 105 in FIG. 1. The media state sensing signals 16, 26, 36, 46 correspond to the first sensing signal 106 in FIG. 1. The media state sensing signals 16, 26, 36, 46 contain the media state. The media state is defined by a combination of a value indicating whether or not the media stream is started and the media type of the media stream. The "media type" is the type by which the quality of the media stream is sorted, and takes any one value of "Hi-Fi stereo", "stereo", "monaural", and "monaural talking".

The outputting unit 51 outputs the media stream being input into the input channels IN1, IN2, IN3, IN4 to output channels OUT1, OUT2, OUT3, in compliance with the output state instruction that the output destination deciding unit 91 decides. At this time, when the outputting unit is instructed to output simultaneously the media streams being input into a plurality of input channels to the same output channel, it superposes these media streams and outputs a resultant stream. Also, when the outputting unit is instructed to output simultaneously the media stream being input into the same input channel to a plurality of output channels, it outputs this media stream to all designated output channels.

Here, in the embodiments of the present invention, the "output state" is defined by the output channel to which the input media stream should be output, i.e., an output route of the media stream.

The built-in microphone 52 converts the sound generated by the user in the phone conversation into an electric signal, and outputs the signal to the coding unit 12. The displaying unit 53 displays the pix map data output from the image decoding unit 44, and displays messages, selected items, and the like according to the instruction of the output destination deciding unit 91 to provide them to the user. The cross key 54 is an operator used to input the user's operation. The operation input accepting unit 55 accepts the operation input given by the operation of the cross key 54, and outputs operation input information 551 to the output destination deciding unit 91. The setting unit 56 accepts the operation input given by the operation of the cross key 54, and sets priority output information 931 which a priority output information holding unit 93 holds.

The Bluetooth communicating unit 61 communicates with a headset 63 having a Bluetooth communication function, outputs the sound being output to the output channel OUT1 of the outputting unit 51 to the headset 63 and the sound being input into the headset 63 to the coding unit 12 respectively, and informs a first connection state sensing unit 62 of a start and an end of a communication connection to the headset 63. The first connection state sensing unit 62 outputs the media state sensing signal 46 containing information of the connection state of the headset 63 to the output destination deciding unit 91 based on the notice from the Bluetooth communicating unit 61.

A headphone jack 71 is a terminal used to connect a stereo headphone 73 or a monaural earphone 75 to the outputting unit 51. The headphone jack 71 outputs the sound that is to be output to the output channel OUT2 of the outputting unit 51, and informs a second connection state sensing unit 72 that the stereo headphone 73 or the monaural earphone 75 is attached or detached. The second connection state sensing unit 72 outputs a connection state sensing signal 74 containing information of the connection states of the stereo headphone 73 and the monaural earphone 75 to the output destination deciding unit 91 based on the notice from the headphone jack 71.

A built-in speaker 81 converts the sound media stream being output to the output channel OUT3 of the outputting unit 51 into the audible sound, and emits this sound. Also, the built-in speaker 81 informs a third connection state sensing unit 82 whether or not such speaker is in a state that it can emit the sound. The third connection state sensing unit 82 outputs a connection state sensing signal 84 containing information of the connection state of the built-in speaker 81 to the output destination deciding unit 91 based on the notice from the built-in speaker 81.

Here, in the embodiments of the present invention, the headset 63, the stereo headphone 73, the monaural earphone 75, and the built-in speaker 81 correspond to the providing device 2 in FIG. 1. Also, the first connection state sensing unit 62, the second connection state sensing unit 72, and the third connection state sensing unit 82 correspond to the connection state sensing unit 102 in FIG. 1. Also, the connection state is defined by the providing device that is connected to the outputting unit 51. As the providing device, the headset or the speaker connected via USB (Universal Serial Bus), the device connected via the near field communication such as IrDA (Infrared Data Association), or the like, and others may be employed, in addition to the device built in the cellular phone terminal, the device connected via the adaptor, and the device connected via the Bluetooth communication.

The control portion 90 has the output destination deciding unit 91, a state information holding unit 92, and a priority output information holding unit 93. The output destination deciding unit 91 decides the output state of the media stream based on information of the state information holding unit 92 and the priority output information holding unit 93, and then outputs the decided output state to the outputting unit 51.

The state information holding unit 92 holds media state information 921, connection state information 922, and output state information 923, which represent the state of the cellular phone terminal 1. The media state information 921 is the information describing all media states on the input channel IN1 to IN4 of the outputting unit 51, and is formed/updated based on the media states of the media state sensing signals 16, 26, 36, 46. The connection state information 922 is the information describing all connection states of the output channels OUT1 to OUT3 of the outputting unit 51, and is formed/updated based on the connection states of the connection state sensing signals 64, 74, 84. The output state information 923 is the information representing a present output state, and describes to which output channel the media stream being input into the input channels IN1 to IN4 of the outputting unit 51 is output. The priority output information holding unit 93 holds the priority output information 931.

The output destination deciding unit 91 decides the output state of the outputting unit 51 based on the media states of the media state sensing signals 16, 26, 36, 46, the connection states of the connection state sensing signals 64, 74, 84, the priority output information 931 held by the priority output information holding unit 93, and the operation input information 551 output from the operation input accepting unit 55. Also, the output destination deciding unit 91 instructs the outputting unit 51 to update the output state. Also, the output destination deciding unit 91 updates the media state information 921, the connection state information 922, and the output state information 923 held by the state information holding unit 92.

Figure 3:
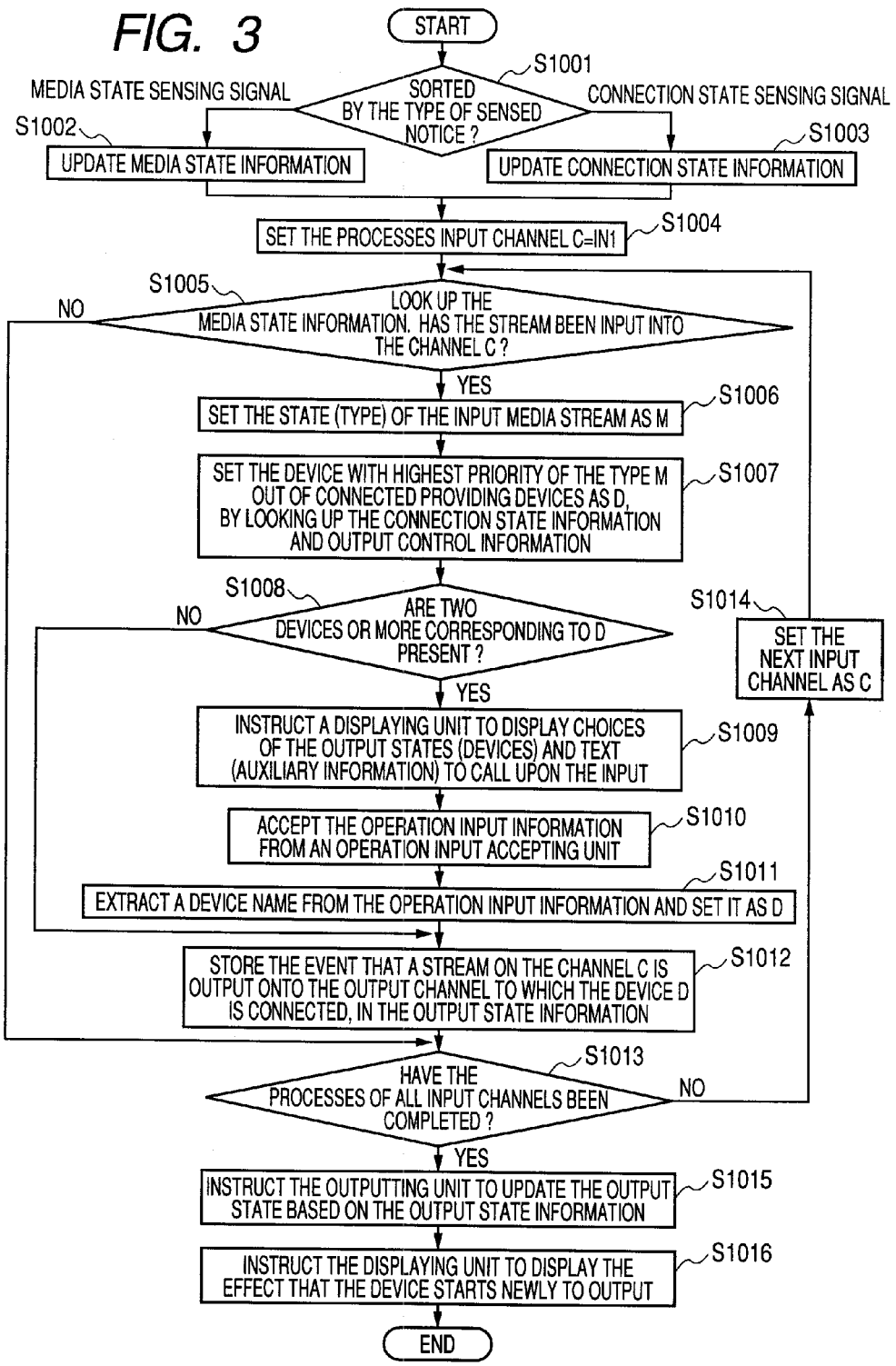
FIG. 3 A flowchart of the cellular phone terminal in embodiments of the present invention.

FIG. 3 is a flowchart showing control operation procedures performed when the media state sensing unit of the cellular phone terminal in embodiments of the present invention senses a change of the media state or when the connection state sensing unit senses a change of the connection state to the providing device. The output destination deciding unit 91 sorts the process according to that the received signal is either the media state sensing signal or the connection state sensing signal (S1001). When the output destination deciding unit 91 sensed the media state sensing signal, it updates the media state information 921 that the state information holding unit 92 holds, based on the media state sensing signal (S1002). When the output destination deciding unit 91 sensed the connection state sensing signal, it updates the connection state information 922 that the state information holding unit 92 holds, based on the connection state sensing signal (S1003).

A process of deciding the output state is executed in step S1004 to step S1014. First, the output destination deciding unit 91 set the input channel IN1 in the variable C representing the channel (S1004). Then, the output destination deciding unit 91 examines whether or not the media stream has been input into the channel C, i.e., the input channel IN1, by looking up the media state information 921 that the state information holding unit 92 holds (S1005). The input state denotes a state that the phone conversation is started, a state that the ringtone is reproduced, a state that the music contents are reproduced, a state that the sound data is started, or the like. Then, if the media stream has been input into the channel C, the output destination deciding unit 91 acquires the type of the input media stream from the media state information, and substitutes the type of the input media stream into the variable M (S1006). Then, the output destination deciding unit 91 substitutes the device with highest priority of the media type M out of the connected providing devices 2 into the variable D representing the providing device, by looking up the connection state information 922 that the state information holding unit 92 holds and the priority output information 931 that the priority output information holding unit 93 holds (S1007). At this time, if there are a plurality of devices D having the highest priority of the media type M (S1008), the output destination deciding unit 91 instructs the displaying unit 53 to display choices, which indicate to which providing device the media stream can be output, and the text (=auxiliary information) to call upon the input (S1009).

In turn, when the user selects the choice by operating the cross key 54, the operation input accepting unit 55 accepts the selecting operation and outputs the operation input information 551 (S1010). Then, the output destination deciding unit 91 receives the operation input information 551, extracts the name of the providing device from the operation input information 551, and substitutes the name into the variable D (S1011). Here, the output destination deciding unit 91 stores the information indicating that the media stream being input into the input channel C is output onto the output channel (any one of OUT1 to OUT3) of the outputting unit 51, to which the providing device D is connected, in the output state information 923 that the state information holding unit 92 holds (S1012).

If the processes in step S1006 to step S1012 of all input channels have not been completed (S1013), the output destination deciding unit 91 sets the next input channel as C (S1014). Then, the process goes back to step S1005, and then similar processes are executed.

If the processes in step S1004 to step S1014 of all input channels of the outputting unit 51 have been completed, the output destination deciding unit 91 instructs the outputting unit 51 to update the output state based on the output state information 923 (S1015). Also, the output destination deciding unit 91 instructs the displaying unit 53 to display the effect that the output is started from the providing device that starts newly the output by the instruction in step S1015 (S1016).

FIG. 4 is a view showing the priority output information 931 in the embodiments of the present invention. Items in the longitudinal direction show the providing device connected to the outputting unit 51, and items in the lateral direction show the type of the media stream as the input of the outputting unit 51. A numerical value in each column indicates output priority of each providing device every type of the media stream. A numerical value 0 denotes the lowest priority, and a numerical value 3 denotes the highest priority. For example, the monaural talking (priority 3) is output most preferentially to the headset, and the Hi-Fi stereo (priority 0) is output to the headset with lowest preference.

Operations carried out when the media state and the connection state are changed in the cellular phone terminal in embodiments of the present invention will be explained with reference to FIG. 5 to FIG. 17 hereinafter.

FIRST EMBODIMENT

In Embodiment 1, the phone call comes in to the cellular phone terminal while the user plays the music contents by the cellular phone terminal, and the user talks on the phone. When the Bluetooth headset is connected to the cellular phone terminal during the phone conversation, the output state is switched automatically in such a manner that the user can listens the music by the built-in speaker and the user can hears the phone conversation sound by the headset.

Figure 5A:
FIG. 5(*a*) an image view showing a situation that the user is reproducing music contents by a cellular phone terminal in Embodiment 1 of the present invention, and (*b*) an image view showing a situation that the user talks on the cellular phone terminal while reproducing the music contents.
Figure 5B:

FIG. 5 is an explanatory view of utilization images of a cellular phone terminal in Embodiment 1 of the present invention.

When the music that the cellular phone terminal 1 is reproducing is emitted from a built-in speaker 81 and the user is listening this music (FIG. 5(*a*)), the phone call comes in to the terminal. At this time, the user establishes a communication with the headset 63 and the cellular phone terminal 1 by turning ON a power supply of the Bluetooth headset 63. Thus, the user hears the phone conversation sound emitted from the headset 63, and still continues to listen the music emitted from the built-in speaker 81 (FIG. 5(*b*)).

Figure 6:
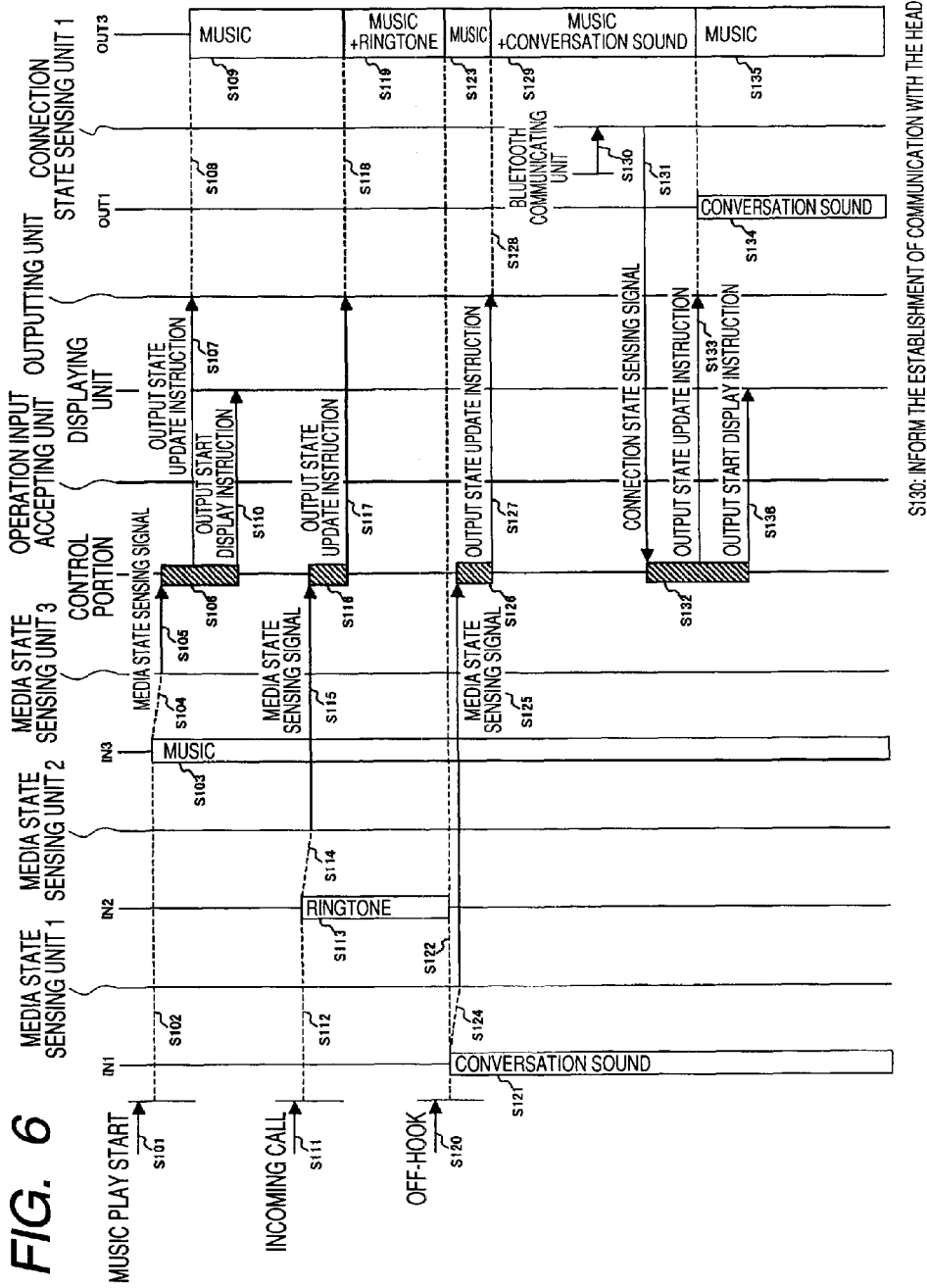
FIG. 6 A sequence diagram of the cellular phone terminal in Embodiment 1 of the present invention.

FIG. 6 is a process sequence diagram of the cellular phone terminal in Embodiment 1. In FIG. 6, portions to which the hatching is applied represent that the control portion 90 executes the flowchart in FIG. 3 explained previously in that location. Also, FIG. 7 is a view showing how the media state information 921, the connection state information 922, and the output state information 923, which are held by the state information holding unit 92, should be changed in the process of the cellular phone terminal in Embodiment 1 as the process is progressing ahead. The number of each step shown in FIG. 7 corresponds to the number of step affixed to the sequence in FIG. 6. An empty space represents that the contents are not changed from the preceding step. Also, "–" in the columns of the media state, the connected device, and the output contents represents that no value is set there.

A flow of the process of the cellular phone terminal in Embodiment 1 will be explained with reference to FIG. 6 and FIG. 7 hereunder. First, in an initial state, the media state information 921 is set to a media state 1100*a* shown in FIG. 7. That is, no media stream is input into the input channels IN1 to IN4 of the outputting unit 51. The connection state information 922 is shown as a connected device 1100*b*. That is, the built-in speaker is connected to the output channel OUT3 of the outputting unit 51 to emit the sound, and no providing device is connected to other output channels (OUT1, OUT2). The output state information 923 is shown as an output contents 1100*c*. That is, nothing is output to the output channels OUT1 to OUT3.

When the music play is started (step S101), the media stream of the music contents (media type="Hi-Fi stereo") that the music reproducing unit 32 outputs is input into the input channel IN3 of the outputting unit 51 (steps S102, S103). The third media state sensing unit 35 senses that the music play is started (step S104), and sends out the media state sensing signal 36 to the control portion 90 (step S105). In step S106, the control portion 90 starts the process shown in the flowchart in FIG. 3, updates the media state information 921 as shown as a media state 1106*a* in FIG. 7 by the processes in steps S1001 and S1002 in FIG. 3, decides the output state by the processes in steps S1004 to S1014 in FIG. 3, and updates the output state information 923 as shown as an output contents 1106*c* in FIG. 7. That is, the control portion 90 updates to output the media stream being input into the input channel IN3 to the output channel OUT3.

In the process in step S1015, when the output destination deciding unit 91 instructs the outputting unit 51 to update the output state in accordance with the output state information 1106*c* (step S107), the outputting unit 51 changes the output state (step S108). When the output of the media stream of the music contents to the output channel OUT3 is started (step S109), the built-in speaker 81 connected to the output channel OUT3 emits the music. In step S1016 in FIG. 3, since the output to the built-in speaker 81 is started newly, the output destination deciding unit 91 instructs the displaying unit 53 to display that effect (step S110).

When the phone call comes in (step S111), the ringtone reproducing unit 21 starts the reproduction of the ringtone and the media stream of the ringtone (media type="stereo") is input into the input channel IN2 of the outputting unit 51 (steps S112, S113). The second media state sensing unit 25 senses that the reproduction of the ringtone is started (step S114), it sends out the media state sensing signal 26 to the control portion 90 (step S115). In step S116, the control portion 90 starts the process shown in the flowchart in FIG. 3, and updates the media state information 921 as shown as a media state 1106*a* in FIG. 7 by the processes in steps S1001 and S1002 in FIG. 3, decides the output state by the processes in steps S1004 to S1014 in FIG. 3, and updates the output state information 923 as shown as an output contents 1106c in FIG. 7. That is, the control portion 90 updates to superpose the media streams being input into the input channels IN2 and IN3 and output a resultant stream to the output channel OUT3.

In the process in step S1015, when the output destination deciding unit 91 instructs the outputting unit 51 to update the output state in accordance with output state information 1116c (step S117), the outputting unit 51 changes the output state (step S118). When the outputting unit 51 superposes the media streams of the music contents and the ringtone and starts to output a resultant stream to the output channel OUT3 (step S119), the built-in speaker 81 emits the music and the ringtone in their superposed state.

When the user executes the off-hook operation (step S120), the media stream of the phone conversation sound (media type="monaural talking") that the decoding unit 13 outputs is input into the input channel IN1 of the outputting unit 51 (step S121) and the reproduction of the ringtone is stopped (step S122). The first media state sensing unit 15 senses a start of the phone conversation (step S124), and sends out the media state sensing signal 16 to the control portion 90 (step S125). In step S126, the control portion 90 starts the process shown in the flowchart in FIG. 3, and updates the media state information 921 as shown as a media state 1126a in FIG. 7 by the processes in steps S1001 and S1002 in FIG. 3, decides the output state by the processes in steps S1004 to S1014 in FIG. 3, and updates the output state information 923 as shown as an output contents 1126c in FIG. 7. That is, the control portion 90 updates to superpose the media streams being input into the input channels IN1 and IN3 and output a resultant stream to the output channel OUT3.

In the process in step S1015, when the output destination deciding unit 91 instructs the outputting unit 51 to update the output state in accordance with output state information 1126c (step S127), the outputting unit 51 changes the output state (step S128). When the outputting unit 51 superposes the media streams of the music contents and the phone conversation sound and starts to output a resultant stream to the output channel OUT3 (step S129), the built-in speaker 81 emits the music and the phone conversation sound in their superposed state.

When a power supply of the Bluetooth headset 63 is turned ON and then the Bluetooth communicating unit 61 informs the first connection state sensing unit 62 of the establishment of communication with the headset 63 (step S130), the first connection state sensing unit 62 sends out the connection state sensing signal 64 to the control portion 90 (step S131). In step S132, the control portion 90 starts the process shown in the flowchart in FIG. 3, and updates the connection state information 922 as shown as a connected device 1132b in FIG. 7 by the processes in steps S1001 and S1002 in FIG. 3. That is, the control portion 90 updates to indicate that the headset is connected to the output channel OUT1 of the outputting unit 51 and also the built-in speaker is connected to the output channel OUT3 to emit the sound.

Subsequently, the processes in steps S1004 to S1014 are executed. In the case of C=IN1, in the process in step S1007, the headset is selected as the device D having the highest priority of the media type M (="monaural talking"). This is because the priority "3" of the headset set forth in the "monaural talking" column of the priority output information 931 in FIG. 4 shows the higher priority than the priority "2" of the built-in speaker. Then, the output destination deciding unit 91 decides the output state based on above decision, and updates the output state information 923 as shown as output state information 1132c in FIG. 7. That is, the control portion 90 updates to output the media stream of the phone conversation sound being input into the input channel IN1 to the output channel OUT1 and output the media stream of the music being input into the input channel IN3 to the output channel OUT3.

In the process in step S1015, when the output destination deciding unit 91 instructs the outputting unit 51 to update the output state in compliance with the output state information 1132c (step S133), the outputting unit 51 changes the output state and starts to output the media stream of the phone conversation sound to the output channel OUT1 (step S134) and output the media stream of the music to the output channel OUT3 (step S135).

As a result, the phone conversation sound is emitted from the headset 63 and the music is emitted from the built-in speaker 81. Since the headset 63 starts to output newly, the output destination deciding unit 91 instructs the displaying unit 53 to display that effect in step S1016 (step S136). The display output of the displaying unit 53 in step S136 is shown in FIG. 8.

With the above, in Embodiment 1 of the present invention, in a situation that the phone call comes in while the user is reproducing the music contents by the cellular phone terminal and then the user is going to talk on the phone, when the user connects the Bluetooth headset to the cellular phone terminal, this cellular phone terminal switches automatically the output state such that the user can listen the music by the built-in speaker and listen the phone conversation sound by the headset.

In this manner, according to the information output device or the information output control method or the information output control program of the present embodiment, the state of the media stream being input into the outputting unit is sensed and also the connection state between the providing device and the outputting unit is sensed, and then the output state of the outputting unit is decided based on the sensed result and the priority output information. Therefore, the presented state of the media stream can be changed automatically in response to a combination of output media streams and the connection state of the providing device. As a result, the user can continue the listening in an optimal state without a troublesome switching operation, and also user's convenience can be improved.

Also, according to the information output device or the information output control method or the information output control program of the present embodiment, two media streams of the music reproducing sound and the ringtone are superposed and then output to the built-in speaker as the same providing device. Therefore, the user can become easily aware of the incoming call even though such user is reproducing the music, and also user's convenience can be improved.

Also, according to the information output device or the information output control method or the information output control program of the present embodiment, two media streams of the music reproducing sound and the phone conversation sound are separated and output to the built-in speaker and the Bluetooth headset. Therefore, the user can recognize clearly the phone conversation sound and talk on the phone even when such user is reproducing the music, and also user's convenience can be improved.

SECOND EMBODIMENT

In Embodiment 2 of the present invention, in a situation that the phone call comes in while the user plays the music contents by the cellular phone terminal and listens the music by the stereo headphone, when the user pushes the off-hook button, the cellular phone terminal switches automatically the output state in such a manner that the user can hear the phone conversation sound by the built-in speaker while listening the music by the stereo headphone.

FIG. 9 is an explanatory view of utilization images of a cellular phone terminal in Embodiment 2 of the present invention.

Figure 9A:
FIG. 9(a) an image view showing a situation that the user is reproducing music contents by a cellular phone terminal in Embodiment 2 of the present invention, and (b) an image view showing a situation that the user talks on the cellular phone terminal while reproducing the music contents.
Figure 9B:

When the music played by the cellular phone terminal 1 is emitted from the stereo headphone 73 and the user is listening the music (FIG. 9(a)), the phone call comes in to the cellular phone terminal. Then, the user pushes the off-hook button and talks on the phone while listening the phone conversation sound emitted from the built-in speaker 81 via the stereo headphone 73 in a situation that the user press the cellular phone terminal 1 to user's ear (FIG. 9(b)).

Figure 10:
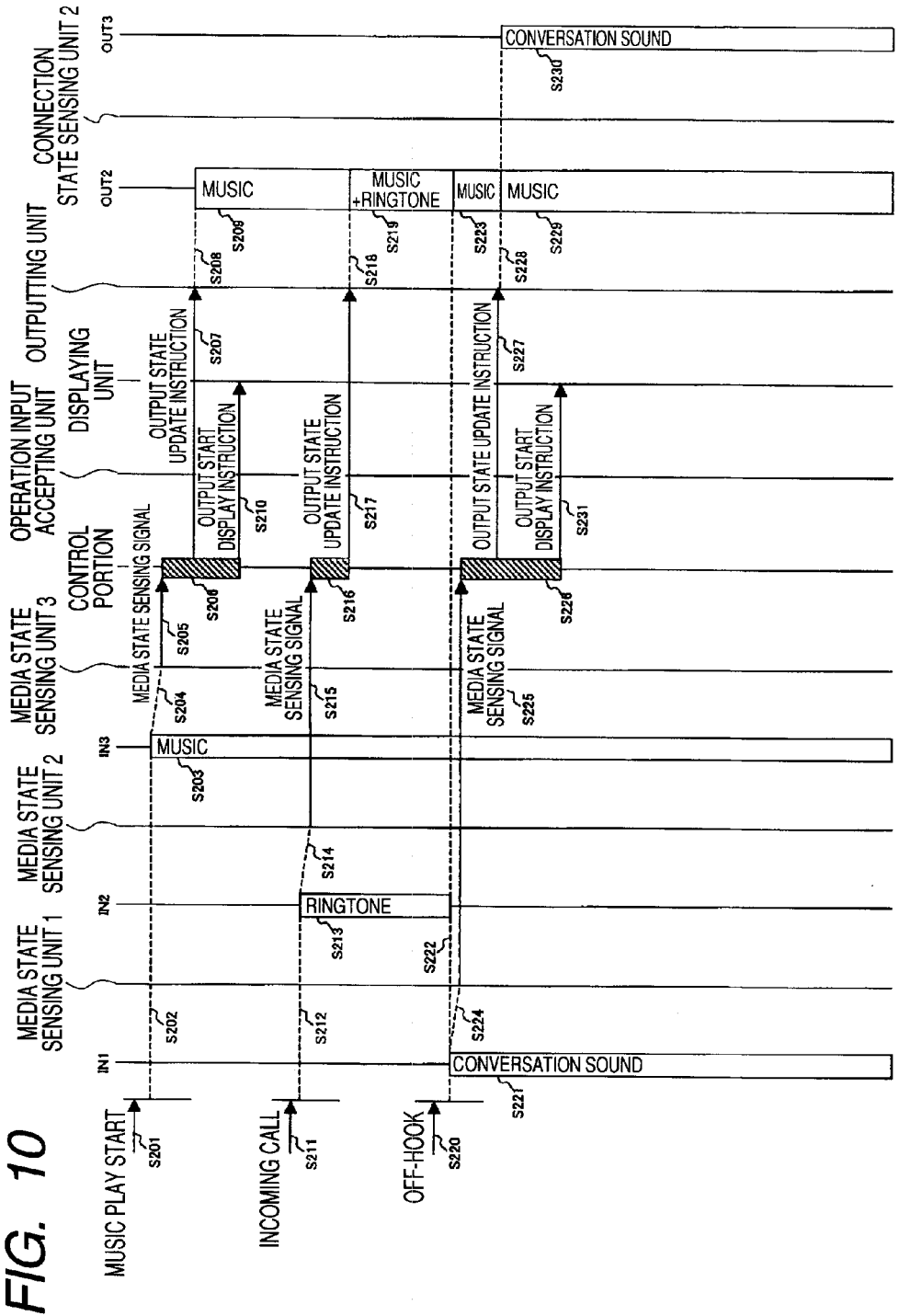
FIG. 10 A sequence diagram of the cellular phone terminal in Embodiment 2 of the present invention.

FIG. 10 is a sequence diagram of the cellular phone terminal in Embodiment 2. Also, FIG. 11 is a view showing how the media state information 921, the connection state information 922, and the output state information 923, which are held by the state information holding unit 92, should be changed in the process of the cellular phone terminal in Embodiment 2 as the process is progressing ahead.

A flow of the process in the cellular phone terminal in Embodiment 2 will be explained with reference to FIG. 10 and FIG. 11 hereunder. First, in an initial state, the media state information 921 is set to a media state 2200a shown in FIG. 11. That is, no media stream is input into the input channels IN1 to IN4 of the outputting unit 51. The connection state information 922 is set to a connected device 2200b. That is, the stereo headphone is connected to the output channel OUT2 of the outputting unit 51 and the built-in speaker is connected to the output channel OUT3 to emit the sound, and no providing device is connected to other output channel (OUT1). The output state information 923 is set to an output contents 2200c. That is, nothing is output to the output channels OUT1 to OUT3.

When the music play is started (step S201), the media stream of the music contents (media type="Hi-Fi stereo") that the music reproducing unit 32 outputs is input into the input channel IN3 of the outputting unit 51 (steps S202, S203). The third media state sensing unit 35 senses that the music play is started (step S204), and sends out the media state sensing signal 36 to the control portion 90 (step S205). In step S206, the control portion 90 starts the process shown in the flowchart in FIG. 3, updates the media state information 921 as shown as a media state 2206a in FIG. 11 by the processes in steps S1001 and S1002 in FIG. 3, decides the output state by the processes in steps S1004 to S1014 in FIG. 3, and updates the output state information 923 as shown as an output contents 2206c in FIG. 11. That is, the control portion 90 updates to output the media stream being input into the input channel IN3 to the output channel OUT2.

In the process in step S1015, when the output destination deciding unit 91 instructs the outputting unit 51 to update the output state in accordance with the output state information 2206c (step S207), the outputting unit 51 changes the output state (step S208). When the output of the media stream of the music contents to the output channel OUT2 is started (step S209), the stereo headphone 73 connected to the output channel OUT2 emits the music. In step S1016 in FIG. 3, since the output to the stereo headphone 73 is started newly, the output destination deciding unit 91 instructs the displaying unit 53 to display that effect (step S210).

When the phone call comes in (step S211), the ringtone reproducing unit 21 starts the reproduction of the ringtone and the media stream of the ringtone (media type="stereo") is input into the input channel IN2 of the outputting unit 51 (steps S212, S213). The second media state sensing unit 25 senses that the reproduction of the ringtone is started (step S214), it sends out the media state sensing signal 26 to the control portion 90 (step S215). In step S216, the control portion 90 starts the process shown in the flowchart in FIG. 3, and updates the media state information 921 as shown as a media state 2216a in FIG. 11 by the processes in steps S1001 and S1002 in FIG. 3, decides the output state by the processes in steps S1004 to S1014 in FIG. 3, and updates the output state information 923 as shown as an output contents 2216c in FIG. 11. That is, the control portion 90 updates to superpose the media streams being input into the input channels IN2 and IN3 and output a resultant stream to the output channel OUT2.

In the process in step S1015, when the output destination deciding unit 91 instructs the outputting unit 51 to update the output state in accordance with output state information 2216c (step S217), the outputting unit 51 changes the output state (step S218). When the outputting unit 51 superposes the media streams of the music contents and the ringtone and starts to output a resultant stream to the output channel OUT2 (step S219), the stereo headphone 73 emits the music and the ringtone in their superposed state.

When the user executes the off-hook operation (step S220), the media stream of the phone conversation sound (media type="monaural talking") that the decoding unit 13 outputs is input into the input channel IN1 of the outputting unit 51 (step S221) and the reproduction of the ringtone is stopped (step S222). The first media state sensing unit 15 senses a start of the phone conversation (step S224), and sends out the media state sensing signal 16 to the control portion 90 (step S225). In step S226, the control portion 90 starts the process shown in the flowchart in FIG. 3, and updates the media state information 921 as shown as a media state 2226a in FIG. 11 by the processes in steps S1001 and S1002 in FIG. 3.

Subsequently, the processes in steps S1004 to S1014 are executed. In the process in step S1007 in the case of C=IN1, the built-in speaker is selected as the device D having the highest priority of the media type M (="monaural talking"). This is because the priority "2" of the built-in speaker set forth in the "monaural talking" column of the priority output information 931 in FIG. 4 shows the higher priority than the priority "1" of stereo headphone. Then, the output destination deciding unit 91 decides the output state based on above decision, and updates the output state information 923 as shown as output state information 2226c in FIG. 11.

That is, the control portion 90 updates to output the media stream being input into the input channel IN1 to the output channel OUT3 and output the media stream being input into the input channel IN3 to the output channel OUT2.

In the process in step S1015, when the output destination deciding unit 91 instructs the outputting unit 51 to update the output state in compliance with the output state information 2226c (step S227), the outputting unit 51 changes the output state (step S228) and starts to output the media stream of the music contents to the output channel OUT2 (step S229) and output the media stream of the phone conversation sound to the output channel OUT3 (step S230). As a result, the phone conversation sound is emitted from the built-in speaker 81 and the music is emitted from the headphone 73. Since the built-in speaker 81 starts to output newly, the output destination deciding unit 91 instructs the displaying unit 53 to display that effect in step S1016 (step S231). The display output of the displaying unit 53 at that time is shown in FIG. 12.

As described above, in Embodiment 2 of the present invention, in a situation that the phone call comes in while the user plays the music contents by the cellular phone terminal and listens the music by the stereo headphone, when the user pushes the off-hook button, the cellular phone terminal switches automatically the output state in such a manner that the user can hear the phone conversation sound by the built-in speaker while listening the music by the stereo headphone.

THIRD EMBODIMENT

In Embodiment 3 of the present invention, when the connection states of the providing devices are changed, the output states having competing priorities mutually are offered to the user as choices to be selected and then the cellular phone terminal switches the output state based on the user's choice.

Figure 13A:
FIG. 13(a) an image view showing a situation that the user is receiving the TV broadcasting by a cellular phone terminal in Embodiment 3 of the present invention, and (b) an image view showing a situation that the user talks on the cellular phone terminal while receiving the TV broadcasting.
Figure 13B:
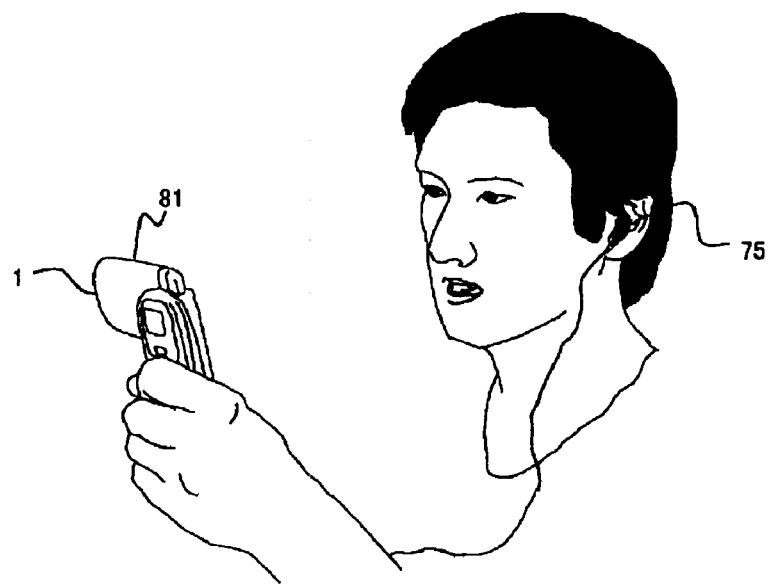

FIG. 13 is an explanatory view of utilization images of a cellular phone terminal in Embodiment 3 of the present invention. When the cellular phone terminal 1 receives the TV broadcasting and the user is listening the TV sound emitted from the built-in speaker 81 (FIG. 13(a)), the phone call comes in and the user connects the monaural earphone 75 to the headphone jack 71 of the cellular phone terminal 1 to listen the phone conversation sound via the monaural earphone 75 while still listening continuously the TV sound emitted from the built-in speaker 81 (FIG. 13(b)).

Figure 14:
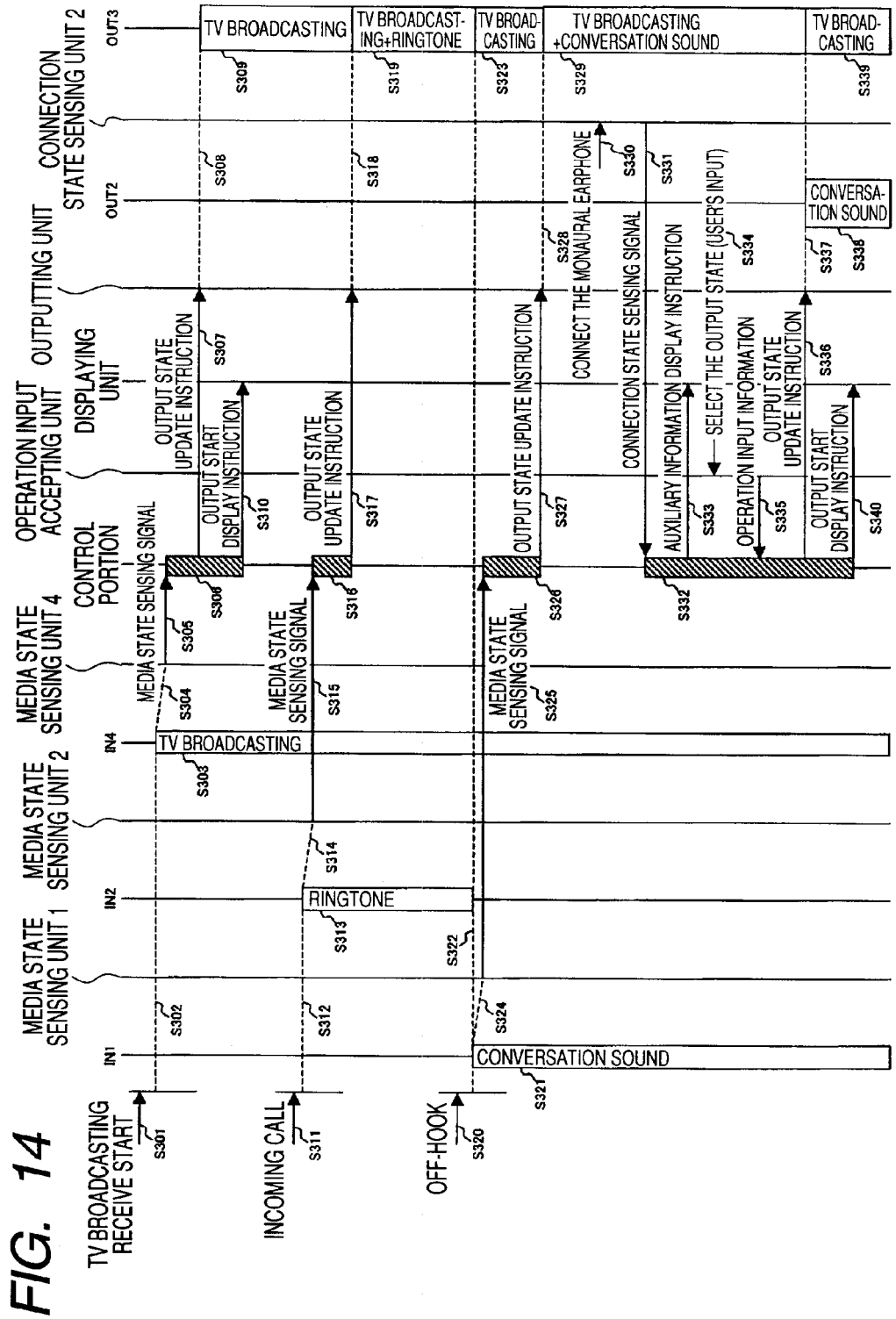
FIG. 14 A sequence diagram of the cellular phone terminal in Embodiment 3 of the present invention.

FIG. 14 is a process sequence diagram of the cellular phone terminal in Embodiment 3. Also, FIG. 15 is a view showing how the media state information 921, the connection state information 922, and the output state information 923, which are held by the state information holding unit 92, should be changed in the process of the cellular phone terminal in Embodiment 3 as the process is progressing ahead.

A flow of the process of the cellular phone terminal in Embodiment 3 will be explained with reference to FIG. 14 and FIG. 15 hereunder. First, in an initial state, the media state information 921 is set to a media state 3300a shown in FIG. 15. That is, no media stream is input into the input channels IN1 to IN4 of the outputting unit 51. The connection state information 922 is shown as a connected device 3300b. That is, the built-in speaker is connected to the output channel OUT3 of the outputting unit 51 to emit the sound, and no providing device is connected to other output channels (OUT1, OUT2). The output state information 923 is shown as an output contents 3300c. That is, nothing is output to the output channels OUT1 to OUT3.

When the reception of the TV broadcasting is started (step S301), the media stream of the TV sound (media type="monaural") that the sound decoding unit 43 outputs is input into the input channel IN4 of the outputting unit 51 (steps S302, S303). The fourth media state sensing unit 45 senses that the output of the TV sound is started (step S304), and sends out the media state sensing signal 46 to the control portion 90 (step S305). In step S306, the control portion 90 starts the process shown in the flowchart in FIG. 3, updates the media state information 921 as shown as a media state 3306a in FIG. 15 by the processes in steps S1001 and S1002 in FIG. 3, decides the output state by the processes in steps S1004 to S1014 in FIG. 3, and updates the output state information 923 as shown as an output contents 3306c in FIG. 15. That is, the control portion 90 updates to output the media stream being input into the input channel IN4 to the output channel OUT3.

In the process in step S1015, when the output destination deciding unit 91 instructs the outputting unit 51 to update the output state in accordance with the output state information 3306c (step S307), the outputting unit 51 changes the output state (step S308). When the output of the media stream of the TV sound to the output channel OUT3 is started (step S309), the built-in speaker 81 connected to the output channel OUT3 emits the TV sound. In step S1016 in FIG. 3, since the output to the built-in speaker 81 is started newly, the output destination deciding unit 91 instructs the displaying unit 53 to display that effect (step S310).

When the phone call comes in (step S311), the ringtone reproducing unit 21 starts the reproduction of the ringtone and the media stream of the ringtone (media type="stereo") is input into the input channel IN2 of the outputting unit 51 (steps S312, S313). The second media state sensing unit 25 senses that the reproduction of the ringtone is started (step S314), it sends out the media state sensing signal 26 to the control portion 90 (step S315). In step S316, the control portion 90 starts the process shown in the flowchart in FIG. 3, and updates the media state information 921 as shown as a media state 3316a in FIG. 15 by the processes in steps S1001 and S1002 in FIG. 3, decides the output state by the processes in steps S1004 to S1014 in FIG. 3, and updates the output state information 923 as shown as an output contents 3316c in FIG. 15. That is, the control portion 90 updates to superpose the media streams being input into the input channels IN2 and IN4 and output a resultant stream to the output channel OUT3.

In the process in step S1015, when the output destination deciding unit 91 instructs the outputting unit 51 to update the output state in accordance with output state information 3316c (step S317), the outputting unit 51 changes the output state (step S318). When the outputting unit 51 superposes the media streams of the TV sound and the ringtone and starts to output a resultant stream to the output channel OUT3 (step S319), the built-in speaker 81 emits the TV sound and the ringtone in their superposed state.

When the user executes the off-hook operation (step S320), the media stream of the phone conversation sound (media type="monaural talking") that the decoding unit 13 outputs is input into the input channel IN1 of the outputting unit 51 (step S321) and the reproduction of the ringtone is stopped (step S322). The first media state sensing unit 15 senses a start of the phone conversation (step S324), and sends out the media state sensing signal 16 to the control portion 90 (step S325). In step S326, the control portion 90 starts the process shown in the flowchart in FIG. 3, and updates the media state information 921 as shown as a media state 3326a in FIG. 15 by the processes in steps S1001 and S1002 in FIG. 3, decides the output state by the processes in steps S1004 to S1014 in FIG. 3, and updates the output state information 923 as shown as an output contents 3326c in FIG. 15. That is, the control portion 90 updates to superpose the media streams being input into the input channels IN1 and IN4 and output a resultant stream to the output channel OUT3.

In the process in step S1015, when the output destination deciding unit 91 instructs the outputting unit 51 to update the output state in accordance with output state information 3326c (step S327), the outputting unit 51 changes the output state (step S328). When the outputting unit 51 superposes the TV sound and the phone conversation sound and starts to output a resultant stream to the output channel OUT3 (step S329), the built-in speaker 81 emits the TV sound and the phone conversation sound in their superposed state.

When the monaural earphone 75 is connected to the headphone jack 71, the second connection state sensing unit 72 senses such connection (step S330). Then, the second connection state sensing unit 72 sends out the connection state sensing signal 74 to the control portion 90 (step S331). In step S332, the control portion 90 starts the process shown in the flowchart in FIG. 3, and updates the connection state information 922 as shown as a connected device 3332b in FIG. 15 by the processes in steps S1001 and S1002 in FIG. 3. That is, the control portion 90 updates to indicate that the monaural earphone is connected to the output channel OUT2 of the outputting unit 51 and also the built-in speaker is connected to the output channel OUT3 to emit the sound.

Subsequently, the processes in steps S1004 to S1014 are executed. In the process in step S1007 in the case of C=IN1, both the monaural earphone and the built-in speaker correspond to the device D having the highest priority of the media type M (="monaural talking"). This is because the priority "2" of the monaural earphone set forth in the "monaural talking" column of the priority output information 931 in FIG. 4 and the priority "2" of the built-in speaker shows the same priority. Therefore, since the above situation agrees with "Two devices or more corresponding to D are present" as the condition in step S1008, the processes in steps S1009 to S1011 are executed. In step S1009, the control portion 90 instructs the displaying unit 53 to display the choices of the output states (devices) and auxiliary information consisting of the text to call upon the inputting operation (step S333).

Figure 16A:
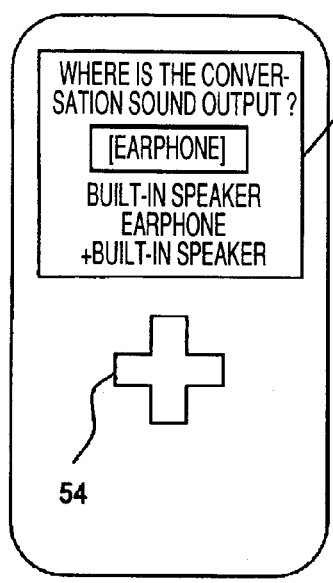
FIG. 16(a) a view showing a display of auxiliary information in Embodiment 3 of the present invention, and (b) a view showing an output starting display in Embodiment 3 of the present invention.

The display output of the displaying unit 53 in step S333 is shown in FIG. 16(a). Three choices of the output state are displayed under the text used to call upon the inputting operation. The "earphone" shows the choice that the phone conversation sound is output to the monaural earphone 75, the "built-in speaker" shows the choice that the phone conversation sound is output to the built-in speaker 81, and the "earphone+built-in speaker" shows the choice that the phone conversation sound is output to both the monaural earphone 75 and the built-in speaker 81. At this time, the providing device connected to the outputting unit 51 lastly is detected based on the connection state information 922, and then the item of the choice to be output to that providing device is displayed in a focused (encircled by a rectangle) mode. In the present embodiment, since the monaural earphone is connected lastly, the item "earphone" is displayed in a focused mode. The user can move a focus of the item by pushing the upper end and the lower end of the cross key 54. Also, the user can select/decide the item in a focused state by pushing the center portion. Here, the following processes will be explained under the assumption that the user has selected/decided the item "earphone".

Figure 17:
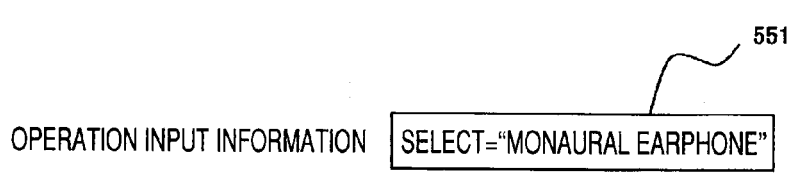
FIG. 17 A view showing a description format of operation input information in Embodiment 3 of the present invention.

When the user executes the operation to select the output state by selecting the choice (step S334), the operation input accepting unit 55 senses the operation input and informs the control portion 90 of the operation input information 551 (step S335). The informed operation input information 551 is shown in FIG. 17. The operation input information 551 consists of the indication of [select=] and the text obtained by putting the providing device name corresponding to the chosen item in double quotation marks. In step S1010 in FIG. 3, the control portion 90 receives the operation input information 551. Then, in step S1011, the control portion 90 extracts the providing device name "monaural earphone" from the received operation input information 551 and then substitutes the name into the variable D.

The output destination deciding unit 91 decides the output state based on above processes, and updates the output state information 923 as shown as output state information 3332c in FIG. 15. That is, the control portion 90 updates to output the media stream of the phone conversation sound being input into the input channel IN1 to the output channel OUT2 and output the media stream of the TV sound being input into the input channel IN4 to the output channel OUT3.

Figure 16B:
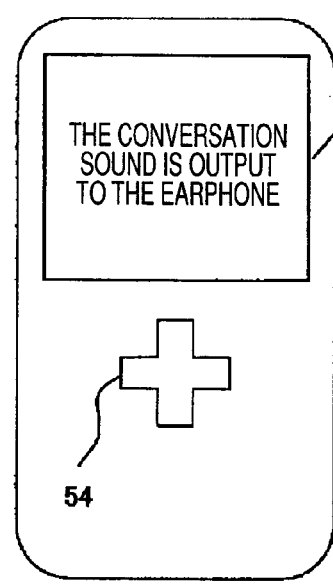

In the process in step S1015, when the output destination deciding unit 91 instructs the outputting unit 51 to update the output state in compliance with the output state information 3332c (step S336), the outputting unit 51 changes the output state and starts to output the media stream of the phone conversation sound to the output channel OUT2 (step S338) and output the media stream of the TV sound to the output channel OUT3 (step S339). As a result, the phone conversation sound is emitted from the monaural earphone 75 and the TV sound is emitted from the built-in speaker 81. Since the monaural earphone 75 starts to output newly, the output destination deciding unit 91 instructs the displaying unit 53 to display that effect in step S1016 (step S340). The display output of the displaying unit 53 at this time is shown in FIG. 16(b).

With the above, in Embodiment 3 of the present invention, when the connection states of the providing devices are changed, the output states having competing priorities mutually are offered to the user as choices to be selected and then the cellular phone terminal switches the output state based on the user's choice.

Also, according to the information output device or the information output control method or the information output control program of the present embodiment, when two priority output states or more are derived based on the state of the media stream, the connection state between the providing device and the outputting unit, and the priority output information, the operation input of the selecting operation is accepted after the choices of the output states are presented and then the cellular phone terminal decides the output state based on the input result. Therefore, when a conflict is caused between the priority output states, the cellular phone terminal can decide the output state based on the user's decision. As a result, the user can select flexibly the listening method according to the situation, and also the user's convenience can be improved.

FOURTH EMBODIMENT

In Embodiment 4 of the present invention, a process of setting the priority output information 931 of the providing device will be explained with reference to FIG. 18 and FIG. 19 hereunder. FIG. 18 is a view showing mutually different variations of the priority output information 931. FIG. 18(a) shows a "sound quality priority mode", FIG. 18(b) shows an "external output priority mode", and FIG. 18(c) shows a "concealed phone conversation mode".

In the priority output information in FIG. 18(a), the priority of the stereo headphone about the Hi-Fi stereo is extremely higher than others, and gives the priority output information that attaches the importance to the sound quality such that only the media stream of the high sound quality is separated from other media streams and is reproduced by the stereo headphone. In the priority output information in FIG. 18(b), the priority of the providing device except the built-in speaker, i.e., the providing device that outputs the media stream to the outside of the cellular phone terminal is set high wholly. There is provided the priority output information that outputs the media stream preferentially to the external device when the providing device used to output the media stream to the external device is connected. In the priority output information in FIG. 18(c), the priority of the providing device that outputs the monaural talking to the external device is set high. There is provided the priority output information that conceals the phone conversation not to output it from the built-in speaker when the providing device used to output the media stream to the external device is connected.

The priority output information in FIGS. 18(a)(b)(c) are held by the setting unit 56. The priority output information 931 can be set to the desired one when the user selects the choices of the priority output information displayed on the displaying unit 53 by the operation of the cross key 54.

Figure 19A:
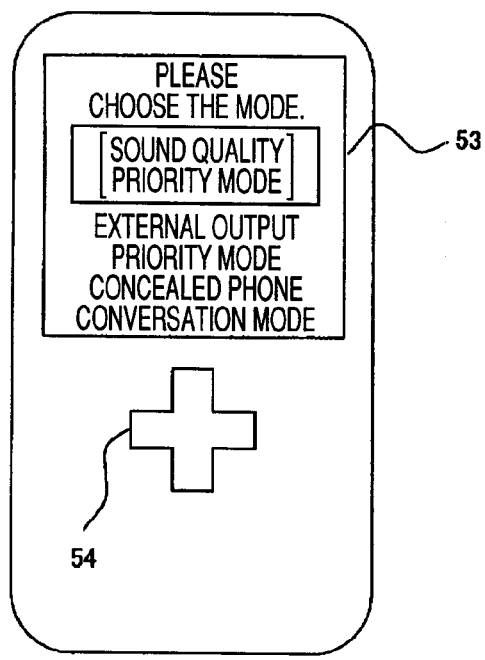
FIG. 19(a) a view showing a screen to select the priority output information in Embodiment 4 of the present invention, and (b) a view showing a setting process screen.
Figure 19B:
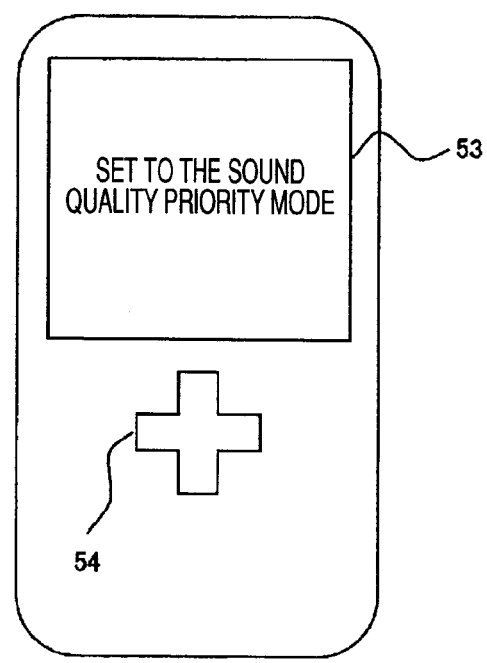

FIG. 19(a) shows a screen to select the priority output information. The "sound quality priority mode" corresponds to the priority output information in FIG. 18(a), the "external output priority mode" corresponds to the priority output information in FIG. 18(b), and the "concealed phone conversation mode" corresponds to the priority output information in FIG. 18(c). The user can move a focus vertically by pushing the upper end and the lower end of the cross key 54, and can select/decide the item in a focused state by pushing the center portion of the cross key 54. The setting unit 56 accepts the selecting operation, and then stores the priority output information corresponding to the selected result in the priority output information holding unit 93 and instructs the displaying unit 55 to display the indication in FIG. 19(b) to inform that the setting process has been completed.

According to the information output device or the information output control method or the information output control program of the present embodiment, the priority output information can be set/changed by the setting unit. Therefore, since the user can set/change the priority output information, the user can select the listening method in answer to the user's taste and also user's convenience can be improved.

Also, in the present embodiment, the audio media stream is employed as the media stream that the outputting unit inputs/outputs, but the media stream is not limited to this. Any media stream may be employed if such stream contains auditory information such as music sequence such as MIDI (Musical Instrument Digital Interface), or the like, parametric audio, composite sound generating parameter sequence, or the like. Also, the similar advantage can be achieved by the media stream containing visual information such as video, moving picture, animation, subtitles, or the like or the media stream containing tactual information such as vibration, or the like.

Also, in the present embodiment, the output state is defined by the output route of the media stream, but the media stream is not limited to this. The output state may defined by sound volume of the media stream, sound quality, output balance of each channel, either of main audio channel/second audio channel, either of stereo/monaural, or the like. Also, the output state may defined by luminance of the video, size, frame rate, or the like.

Also, in the present embodiment, the built-in speaker, the headset, the stereo headphone, and the monaural earphone are employed as the providing device, but the providing device is not limited to this. Any providing device may be employed if such device can present the media stream to perceive visually, audibly, or tactually by external speaker, bone conduction module, display, projector, vibration module, or the like.

Also, in the present embodiment, the method using the Bluetooth communication and the method using the headphone jack are employed as the method of connecting the providing device to the outputting unit, but the providing device is not limited to this. The cable connection such as pin jack, modular jack, optical terminal, USB terminal, serial terminal, parallel terminal, VGA terminal, AV output terminal, external bus connector, IEEE1394 terminal, balance output terminal, DIN terminal, MIDI terminal, conductor, conductive casing, or the like, or the radio connection such as electromagnetic wave such as visible rays, infrared rays, ultraviolet rays, or the like, ultrasonic wave, magnetic transmission, electrostatic capacity transmission, or the like may be employed.

Also, in the present embodiment, the connection state is defined by which providing device is connected to the outputting unit, but the providing device is not limited to this. The connection state may be defined by the output mode selecting state of the providing device such as stereo or monaural, main audio channel or second audio channel, or the like, the parameter such as volume setting value associated with the providing device, or the like. Also, the connection state may be defined by the presenting performance such as color number, resolution, display size, frequency characteristic, or the like.

Also, in the present embodiment, the connection state sensing unit informs the user of the connection state when the connection/disconnection state to the headphone jack is changed or when the Bluetooth communication state is changed, but the connection state sensing unit is not limited to this. The connection state sensing unit may inform the user of the connection state when the physical state such as switch ON/OFF of the providing device, movement across the effective range of a radio, or the like is changed, when the logical state such as completion of the interequipment authentication, or the like is changed, when the available/unavailable state of the providing device involving a change in the external shape such as open/close of the outer lid of the speaker, or the like is changed, when the output mode such as switching of stereo/monaural, main audio channel/second audio channel, or the like is changed, or when the parameter of the presenting output such as the volume increase/decrease in the providing device, or the like is changed.

Also, in the present embodiment, the providing device is connected directly to the outputting unit, but the connection state is not limited to this. If the connection state between the outputting unit and the providing device can be sensed, another device such as amplifier, voice synthesizer module, sound source module, communication module, or the like may be interposed between the outputting unit and the providing device.

Also, in the present embodiment, the media state is defined by a combination of the value indicating whether the media stream is started or not and the media type of the media stream, but the media state is not limited to this. The media state may be defined by a sound volume of the media, a balance, or the like.

Also, in the present embodiment, the Hi-Fi stereo, the stereo, the monaural, and the monaural talking are selected as the media type, but the media type is not limited to this. The type representing the contents of the media stream such as phone conversation sound, music, TV, movie, TV telephone image, subtitles, incoming call notice, or the like may be used, the type representing a difference of the compression type or the format such as ADPCM, MPEG, AVI, WMV, RAM, MOV, WAV, MP3, AAC, AMR, ATRAC, μ-LAW, A-LAW, AIFF, or the like may be used, type representing a difference such as sequence audio such as MIDI, or the like, parametric audio such as AMR, or the like, waveform data such as AAC, or the like may be used, type representing a difference on a surface layer such as image/sound/vibration, or the like may be used, type representing a difference in the frequency characteristic may be used, type depending on a difference in the file size may be used, type depending on a difference in the bit rate may be used, type depending on a difference in the sampling rate may be used, or type depending on a difference in the resolution may be used.

Also, in the present embodiment, the output states are sequentially decided every input channels in step S1004 to step S1014, but the deciding method is not limited to this. The output states may be decided every output channels or connected devices.

Also, in the present embodiment, the choices of the output state are displayed by the text in step S1009, but the display method is not limited to this. The choices may be displayed by the visual unit such as video, graphics, animation, or the like, or the choices may be informed by the sound, or the choices may be informed by the method of lighting, vibrating, or deforming the providing device or a neighboring area of the connection portion of the providing device.

Also, in the present embodiment, when plural devices have the competing priority respectively, the output state is decided in steps S1008 to S1012 after the cellular phone terminal contacts the user about such situation, but the deciding method is not limited to this. The approach of permitting the user to select the device whose output is to be continued or the device whose output is to be stopped after the outputs to plural devices having the competing priority respectively are started once may be employed.

Also, in the present embodiment, the operation input accepting unit accepts the operation input from the cross key in step S1010, but the operation input is not limited to this. The operation input accepting unit may accept the operation input from button, key, mouse, tablet, joy stick, touch panel, remote controller, or the like or the operation input from user's line of sight, sound, gesture, dial tone, or the like in addition to the cross key.

Also, in the present embodiment, the operation input information is given by text data in the format shown in FIG. 17, but the operation input information is not limited to this. Any data may be employed if the output state that the user selected can be identified based on such data. The representation of the markup language such as HTML, XML, SGML, or the like may be employed, or binary data or telegram may be employed.

Also, in the present embodiment, the priority output information is given by the format shown in FIG. 4, but the priority output information is not limited to this. The data in any format may be employed if such data can specify the preferential output state in combinations of the media state and the connection state.

Also, in the present embodiment, the setting unit holds variations of the priority output information, but the holding unit is not limited to this. A priority output information holding unit may hold the priority output information, otherwise the information acquired from the outside via attachable storage media, the Internet, public communication network, data broadcasting, or the like may be selected/set by the setting unit.

Also, in the present embodiment, the cellular phone terminal is explained as an example of the information output device, but the information output device is not limited to this. Fixed-line phone, PDA, electronic book, game machine, television set, radio set, DVD player, headphone stereo, semiconductor player, CD player, music player with a built-in hard disk, audio amplifier, or AV amplifier may be employed. In addition, the information output device is not limited to them, and any device may be employed if such device has a function of outputting the media stream.

The present invention is explained in detail with reference to the particular embodiments. But it is apparent for those skilled in the art that various variations and modifications can be applied without departing a spirit and a scope of the present invention.

This application is based upon Japanese Patent Application (Patent Application No. 2004-311402) filed on Oct. 26, 2004; the contents of which are incorporated herein by reference.

INDUSTRIAL APPLICABILITY

The present invention is available for the case where it is decided automatically how the media stream should be output in response to a combination of media streams such as the output video, the sound, and the like and a connection state of the providing devices such as the headphone, the headset, and the like.

The invention claimed is:

1. An information output device, comprising:
a media state sensing unit that senses a state and a type of a media stream and sends out a first sensing signal;
a connection state sensing unit that senses a connection state of a plurality of providing devices, each one of said providing devices being adapted to provide the media stream and send out a second sensing signal;
a media stream output state deciding unit that decides an output state of the media stream and issues an instruction, based on the first sensing signal output from the media state sensing unit, the second sensing signal output from the connection state sensing unit, and priority output information which specifies an output priority of the media stream with respect to each of the plurality of providing devices;
an outputting unit that outputs the media stream to one of the providing devices based on the instruction from the media stream output state deciding unit; and
a priority output information table for storing output priorities for each type of media streams with respect to respective providing devices, wherein the media stream output state deciding unit refers to the priority output information table to decide the output state of the media stream.

2. The information output device according to claim 1, further comprising a setting unit that sets the priority output information.

3. The information output device according to claim 1, further comprising an operation input accepting unit that senses an operation input to the information output device and outputs operation input information, wherein the output state is decided based on the operation input information.

4. The information output device according to claim 2, wherein the setting unit stores a plurality of priority output information, and sets the priority output information by providing choices of the priority output information and then accepting an operation input of a selecting operation.

5. The information output device according to claim 3, wherein when two preferential output states or more derived based on the state of the media stream, the connection state of the providing device, and the priority output information are present, an operation input of a selecting operation is accepted by providing choices of the output state and then the output state is decided based on an input result.

6. An information output control method of outputting a media stream, comprising steps of:
sensing a state and a type of a media stream;
sending out the sensed state of the media stream as a first sensing signal;
sensing a connection state of a plurality of providing devices, with each one of said providing devices being adapted to provide the media stream;
sending out the sensed connection state of the providing devices as a second sensing signal;
deciding an output state of the media stream and issuing an instruction based on the first sensing signal, the second sensing signal, and priority output information which specifies an output priority of the media stream with respect to each of the plurality of providing devices;
outputting the media stream to one of the providing devices based on the instruction; and storing output priorities for each type of media streams with respect to respective providing devices in a priority output information table, wherein the output state is also decided by referring to the priority output information table to decide the output state of the media stream.

7. The information output control method according to claim 6, further comprising a step of setting the priority output information.

8. The information output control method according to claim 6, further comprising the steps of:

a step of sensing an operation input to output operation input information; and a step of deciding the output state based on an output of the operation input information.

9. The information output device according to claim 1, wherein the output state of the media stream indicates that the media stream is to be output to which of the providing devices.

* * * * *